(12) United States Patent
Jumonji et al.

(10) Patent No.: US 11,361,556 B2
(45) Date of Patent: Jun. 14, 2022

(54) DETERIORATION DIAGNOSIS DEVICE, DETERIORATION DIAGNOSIS SYSTEM, DETERIORATION DIAGNOSIS METHOD, AND STORAGE MEDIUM FOR STORING PROGRAM

(71) Applicant: NEC Corporation, Tokyo (JP)

(72) Inventors: Nana Jumonji, Tokyo (JP); Yuta Shimizu, Tokyo (JP); Hidenori Tsukahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/261,432

(22) PCT Filed: Jul. 8, 2019

(86) PCT No.: PCT/JP2019/026982
§ 371 (c)(1),
(2) Date: Jan. 19, 2021

(87) PCT Pub. No.: WO2020/022042
PCT Pub. Date: Jan. 30, 2020

(65) Prior Publication Data
US 2021/0303883 A1  Sep. 30, 2021

(30) Foreign Application Priority Data

Jul. 25, 2018 (JP) .............................. JP2018-139617

(51) Int. Cl.
*G06T 7/285* (2017.01)
*G06T 7/90* (2017.01)
*G06V 20/58* (2022.01)

(52) U.S. Cl.
CPC ............ *G06V 20/582* (2022.01); *G06V 20/58* (2022.01)

(58) Field of Classification Search
None
See application file for complete search history.

(56) References Cited

FOREIGN PATENT DOCUMENTS

| JP | 2005-182646 A | | 7/2005 | |
|---|---|---|---|---|
| JP | 2005182646 A | * | 7/2005 | |
| JP | 2006-112127 A | | 4/2006 | |
| JP | 2006112127 A | * | 4/2006 | |
| WO | 2018/025341 A1 | | 2/2018 | |
| WO | WO-2018025341 A1 | * | 2/2018 | ............... G08G 1/00 |

OTHER PUBLICATIONS

International Search Report for PCT Application No. PCT/JP2019/026982, dated Sep. 17, 2019.

* cited by examiner

*Primary Examiner* — Samuel D Fereja

(57) ABSTRACT

A deterioration diagnosis device including an acquisition unit that acquires sensing information including at least a captured image captured by an image capture device mounted on a moving body, driving condition information indicating driving details of the moving body, and position information corresponding to the captured image and the driving condition information; a deterioration degree analysis unit that analyzes a deterioration degree of an inspection target appearing in the captured image; and a priority ranking computation unit that computes a priority ranking of the inspection target based on deterioration degrees of the same inspection target appearing in multiple captured images identified by the position information, and the driving condition information corresponding to the identified inspection target.

10 Claims, 18 Drawing Sheets

DETERIORATION DIAGNOSIS DEVICE, DETERIORATION DIAGNOSIS SYSTEM, DETERIORATION DIAGNOSIS METHOD, AND STORAGE MEDIUM FOR STORING PROGRAM

This application is a National Stage Entry of PCT/JP2019/026982 filed on Jul. 8, 2019, which claims priority from Japanese Patent Application 2018-139617 filed on Jul. 25, 2018, the contents of all of which are incorporated herein by reference, in their entirety.

TECHNICAL FIELD

The present invention relates to a deterioration diagnosis device, a deterioration diagnosis system, a deterioration diagnosis method, and a program.

BACKGROUND ART

Public installations such as the road surfaces of roads and information signs installed on roadsides undergo deterioration over time. Administrative authorities diagnose the deterioration degree of public installations that have deteriorated over time and perform maintenance on the deteriorated public installations. A lot of labor is required for such diagnosis of the deterioration degree of public installations.

Patent Document 1 discloses technology for improving the diagnostic accuracy of road states by using diagnosis information generated by multiple vehicles.

Additionally, Patent Document 2 describes technology wherein video images taken by a visible-light camera mounted on a vehicle are image-processed to measure the cracking rates of road surfaces, the presence or absence of potholes in road surfaces, the road surface marking deterioration conditions, and the presence or absence of deterioration of road-associated installations such as guard rails and signs. Said Patent Document 2 describes further including vehicle position information, quantifying and compiling examination results, classifying road deterioration conditions, comparing the quantified road deterioration conditions with past damage data, and quantitatively predicting future road deterioration tendencies.

CITATION LIST

Patent Literature

[Patent Document 1]
PCT International Publication No. WO 2018/025341
[Patent Document 2]
Japanese Unexamined Patent Application, First Publication No. 2006-112127

SUMMARY OF THE INVENTION

Problems to be Solved by the Invention

Improvements are required in the accuracy of work for identifying, from among the above-mentioned public installations including roads and other associated installations, inspection targets and inspection locations that are of high priority for maintaining a safe state within a limited budget. Even among the inspection targets and the inspection locations that are of high priority, it is desirable to begin repairs with public installations that have a particularly high probability of posing a hazard to residents. However, under the current circumstances, identifying such hazardous sites necessitates human judgments such as inspections and resident complaints, and requires a lot of labor.

Therefore, the present invention has, for example, the purpose of providing a deterioration diagnosis device, a deterioration diagnosis system, a deterioration diagnosis method, and a program that solve the above-mentioned problem.

Means for Solving the Problems

According to a first aspect of the present invention, a deterioration diagnosis device is characterized by being provided with an acquisition unit that acquires sensing information including at least a captured image captured by an image capture device mounted on a moving body, driving condition information indicating driving details of the moving body, and position information corresponding to the captured image and the driving condition information; a deterioration degree analysis unit that analyzes a deterioration degree of an inspection target appearing in the captured image; and a priority ranking computation unit that computes a priority ranking of the inspection target based on deterioration degrees of the same inspection target appearing in multiple captured images identified by the position information, and the driving condition information corresponding to the identified inspection target.

According to a second aspect of the present invention, a deterioration diagnosis system is characterized by being provided with an image capture device that captures an image of the outside of a moving body; an acquisition unit that acquires sensing information including at least a captured image captured by the image capture device, driving condition information indicating driving details of the moving body, and position information corresponding to the captured image and the driving condition information; a deterioration degree analysis unit that analyzes a deterioration degree of an inspection target appearing in the captured image; and a priority ranking computation unit that computes a priority ranking of the inspection target based on deterioration degrees of the same inspection target appearing in multiple captured images identified by the position information, and the driving condition information corresponding to the identified inspection target.

According to a third aspect of the present invention, a deterioration diagnosis method is characterized by including steps of acquiring sensing information including at least a captured image captured by an image capture device mounted on a moving body, driving condition information indicating driving details of the moving body, and position information corresponding to the captured image and the driving condition information; analyzing a deterioration degree of an inspection target appearing in the captured image; and computing a priority ranking of the inspection target based on deterioration degrees of the same inspection target appearing in multiple captured images identified by the position information, and the driving condition information corresponding to the identified inspection target.

According to a fourth aspect of the present invention, a program stored in a storage medium is characterized by making a computer in a deterioration diagnosis device execute a process of acquiring sensing information including at least a captured image captured by an image capture device mounted on a moving body, driving condition information indicating driving details of the moving body, and position information corresponding to the captured image and the driving condition information; analyzing a deterioration degree of an inspection target appearing in the captured image; and computing a priority ranking of the inspection target based on deterioration degrees of the same inspection target appearing in multiple captured images identified by the position information, and the driving condition information corresponding to the identified inspection target.

Advantageous Effects of Invention

According to the present invention, the accuracy of work for identifying inspection targets and inspection locations that are of high priority can be improved.

EXAMPLE EMBODIMENT

Hereinafter, a deterioration diagnosis device according to an embodiment of the present invention will be explained with reference to the drawings.

Figure 1:
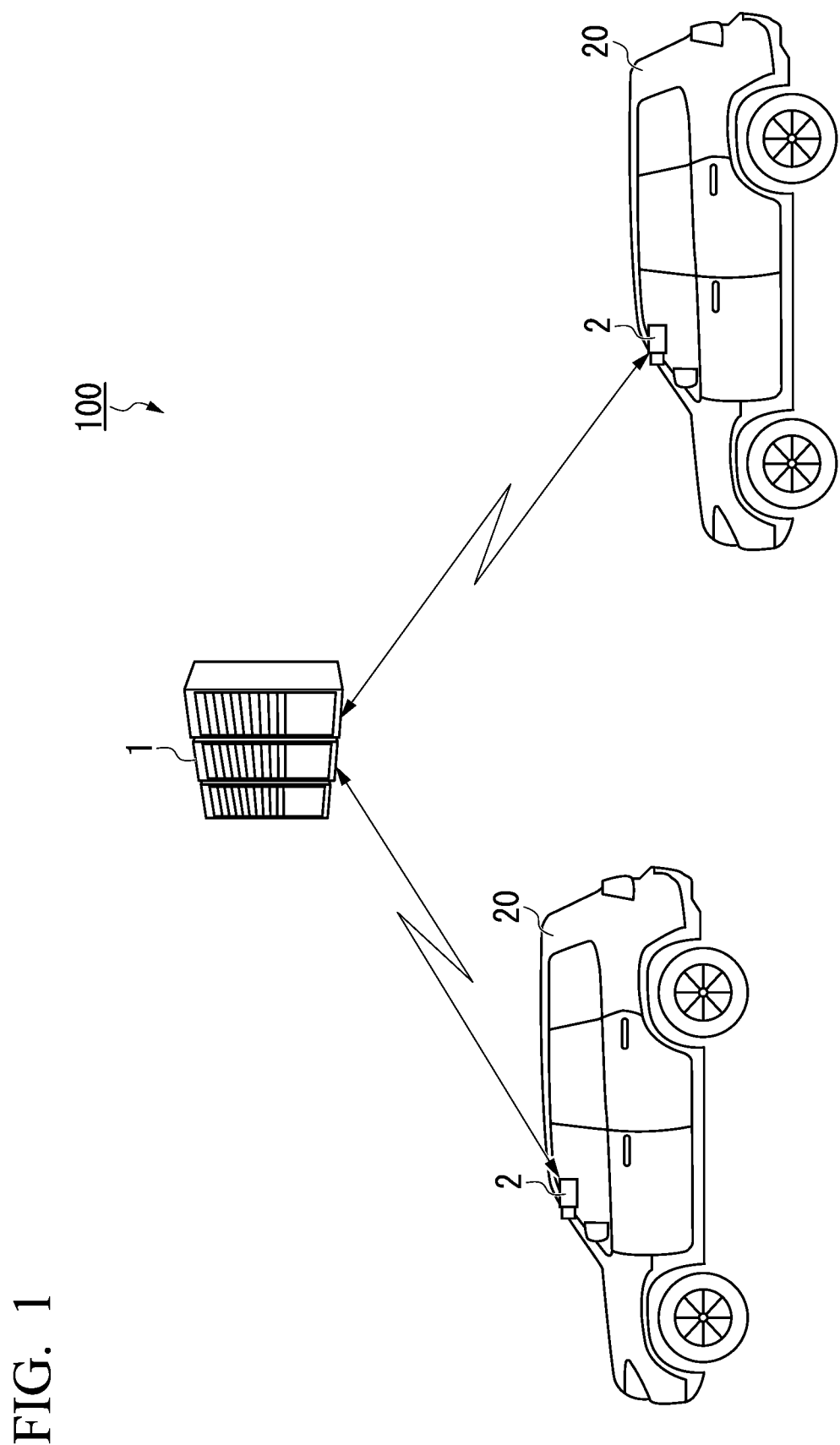
FIG. 1 is a diagram illustrating a summary of a deterioration diagnosis system according to an embodiment of the present invention.

FIG. 1 is a diagram illustrating a summary of a deterioration diagnosis system including the deterioration diagnosis device according to said embodiment.

As illustrated in FIG. 1, the deterioration diagnosis system 100 is formed from a deterioration diagnosis device 1 and drive recorders 2 that are connected by a wireless communication network or by a wired communication network. The deterioration diagnosis device 1 is, for example, a computer server (cloud server) that is installed by a business for performing deterioration diagnoses and that is connected to the communication network. The drive recorders 2 are respectively provided in a plurality of moving bodies. In FIG. 1, vehicles 20 are used as an example of moving bodies for explanation. The moving bodies may include autonomously driven vehicles. The drive recorders 2 have cameras and transmit, to the deterioration diagnosis device 1, captured images capturing the outsides of the vehicles 20.

Figure 2:
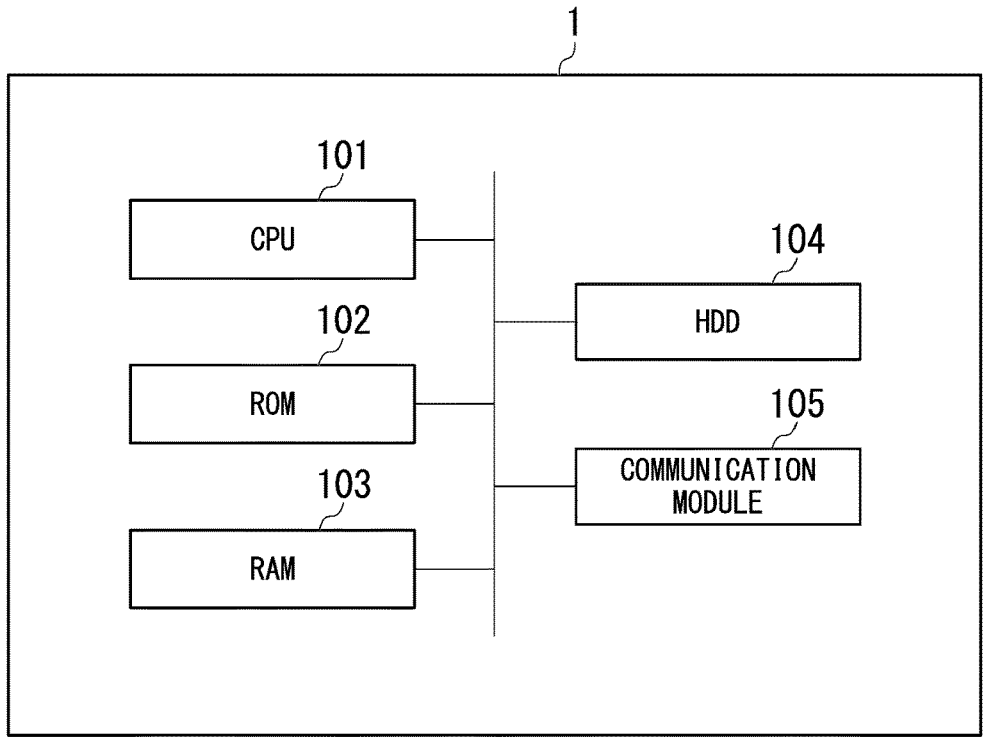
FIG. 2 is a hardware structure diagram of a deterioration diagnosis device according to an embodiment of the present invention.

FIG. 2 is a hardware structure diagram of a deterioration diagnosis device.

As illustrated in this drawing, the deterioration diagnosis device 1 is a computer provided with hardware such as a CPU (Central Processing Unit) 101, a ROM (Read-Only Memory) 102, a RAM (Random Access Memory) 103, an HDD (Hard Disk Drive) 104, and a communication module 105.

Figure 3:
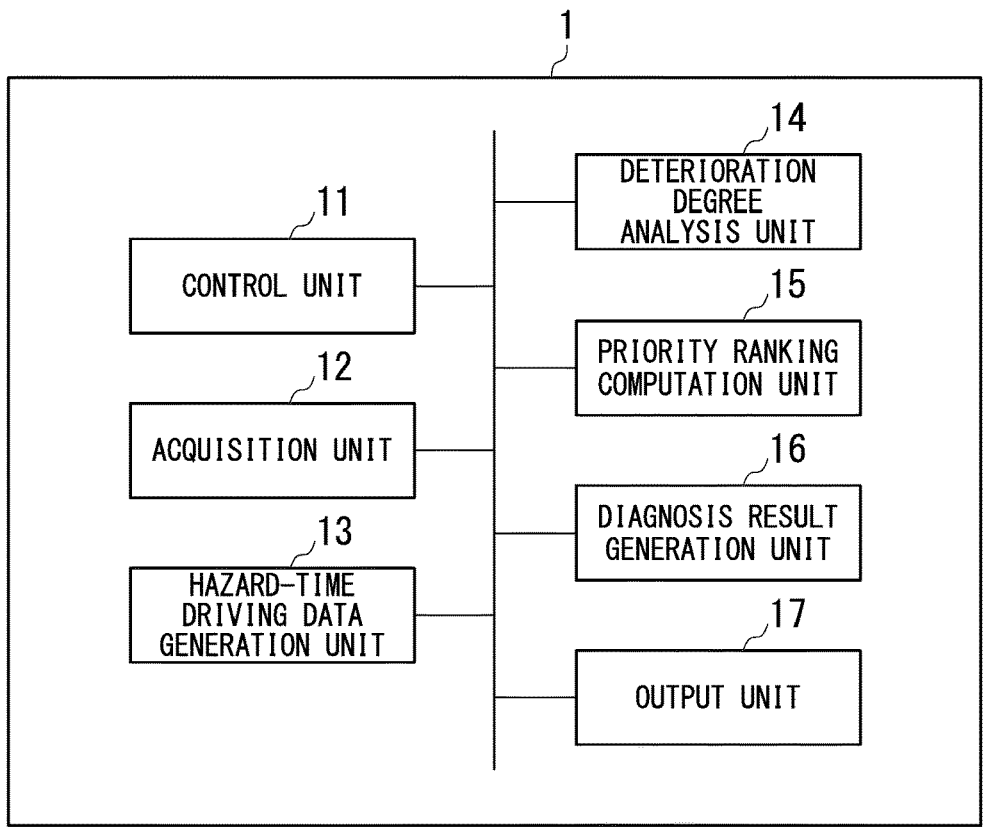
FIG. 3 is a functional block diagram of a deterioration diagnosis device according to an embodiment of the present invention.

FIG. 3 is a functional block diagram of a deterioration diagnosis device.

The deterioration diagnosis device 1 is activated when the power is switched on, and a deterioration diagnosis program that is prestored in memory or the like is executed by the CPU 101. As a result thereof, the deterioration diagnosis device 1 is provided with the functions of a control unit 11, an acquisition unit 12, a deterioration degree analysis unit 14, a priority ranking computation unit 15, a diagnosis result generation unit 16, and an output unit 17.

The control unit 11 controls the functional units of the deterioration diagnosis device 1.

The acquisition unit 12 acquires sensing information including at least captured images captured by the drive recorders 2 mounted on the vehicles 20, driving condition information (driving condition data) of the vehicles 20, and position information for the positions at which those captured images and driving condition information were generated. The driving condition data will be described below.

The deterioration degree analysis unit 14 analyses the deterioration degrees of inspection targets appearing in the captured images. The inspection targets in the present embodiment are public installations such as road surfaces and road-associated objects such as information signs and guard rails installed on the roadsides of roads. Deterioration of road surfaces includes, for example, cracks and ruts in the road surfaces. Additionally, deterioration of road-associated objects includes, for example, changes in the shapes of signs and guard rails.

The priority ranking computation unit 15 computes priority rankings for inspection (examination) of different inspection targets appearing in multiple captured images on the basis of the deterioration degrees of the same inspection target appearing in the captured images identified by the position information, and driving condition information corresponding to the inspection targets.

The diagnosis result generation unit 16 generates diagnosis results including the inspection priority rankings of public installations.

The output unit 17 outputs the diagnosis results to a designated device. The designated device is, for example, a computer used by personnel at an administrative authority that diagnoses the deterioration of public installations, and performs inspections and maintenance thereon.

Figure 4:
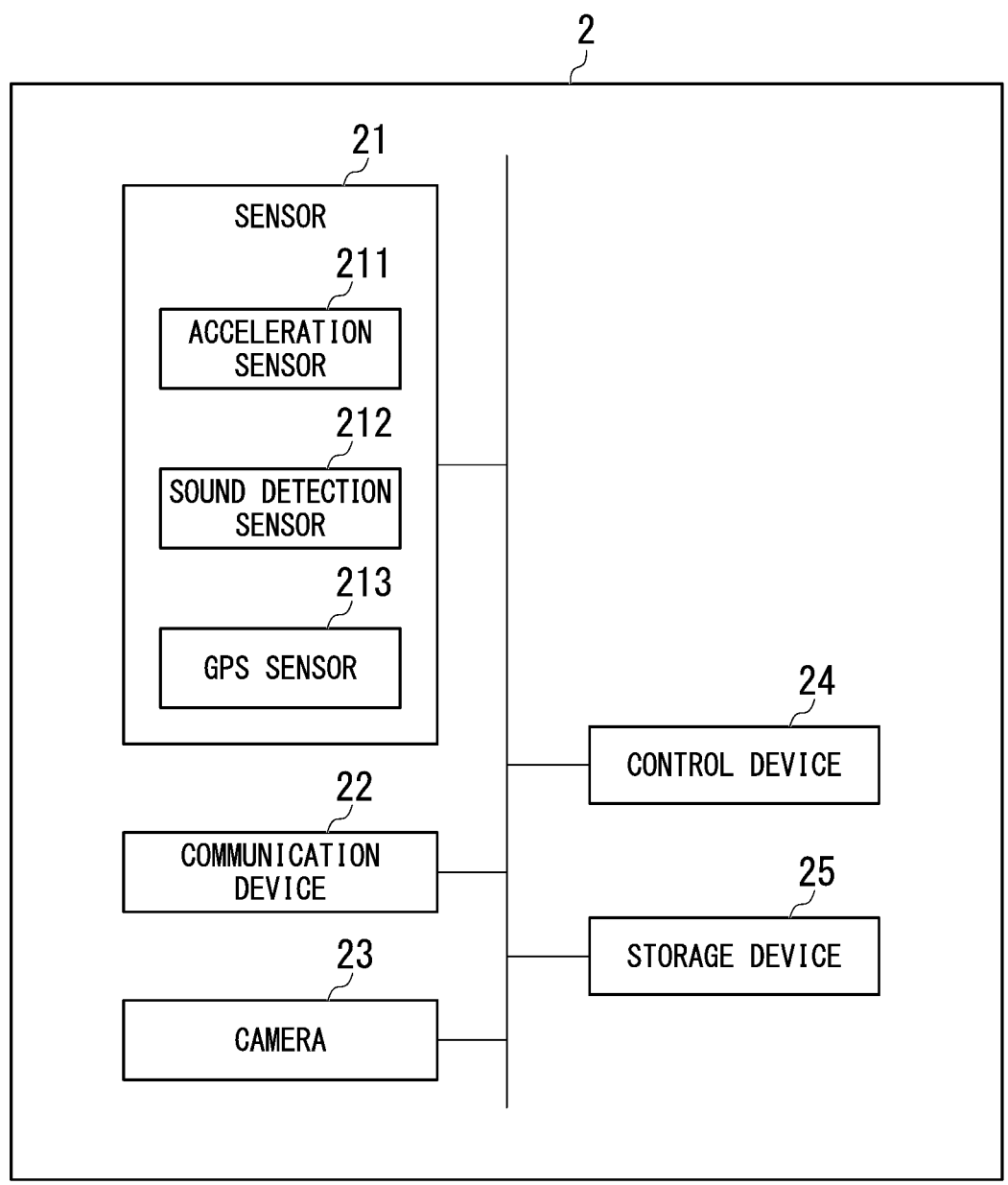
FIG. 4 is a diagram illustrating the hardware structure of a drive recorder according to an embodiment of the present invention.

FIG. 4 is a diagram illustrating the hardware structure of a drive recorder.

The drive recorder 2 includes sensors 21, a communication device 22, a camera 23, a control device 24, a storage device 25, and the like. In the present embodiment, the sensor 21 includes multiple sensors. The sensor 21 may include an acceleration sensor 211, a sound detection sensor 212, a GPS sensor 213, and the like. These sensors 21 are installed at any position on the vehicle outside the drive recorder 2, and the drive recorder 2 may acquire information sensed by these sensors 21. In the present embodiment, an example in which the sensors 21 include an acceleration sensor 211, a sound detection sensor 212, and a GPS sensor 213 is explained, but the invention is not limited to this example. The sensor 21 need only include at least the GPS sensor 213.

The communication device 22 communicates and connects with the deterioration diagnosis device 1. The camera 23 captures images of the outside of the vehicle and generates at least one of moving images and still images. The camera 23 may further capture images of the inside of the vehicle. However, in the present embodiment, the images that are used are images in which public installations appear, generated by capturing images of the outside of the vehicle.

The control device 24 controls the functions of the drive recorder 2. The storage device 25 stores sensing information including at least one of moving images and still images, and various types of information sensed by the sensors 21.

The drive recorder 2 communicates and connects with the deterioration diagnosis device 1 via a base station or the like. The control device 24 of the drive recorder 2 is a computer provided with a CPU, a ROM, a RAM, and the like.

Figure 5:
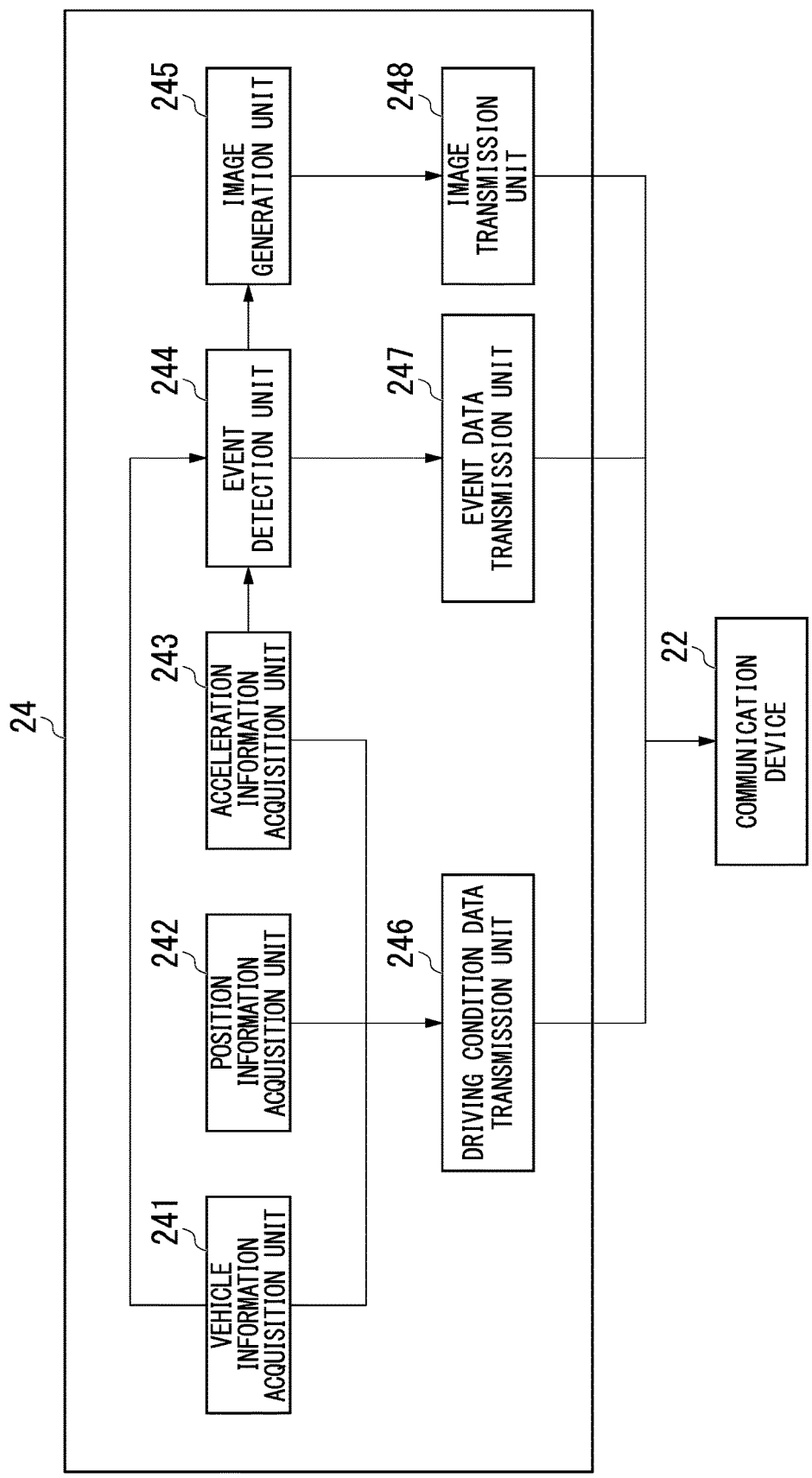
FIG. 5 is a functional block diagram of a control device provided with a drive recorder according to an embodiment of the present invention.

FIG. 5 is a functional block diagram of the control device provided in the drive recorder.

In the control device 24, when the drive recorder is activated, a control program stored in memory or the like is executed by the CPU. As a result thereof, the control device 24 is provided with functional units including a vehicle information acquisition unit 241, a position information acquisition unit 242, an acceleration information acquisition unit 243, an event detection unit 244, an image generation unit 245, a driving condition data transmission unit 246, an event data transmission unit 247, and an image transmission unit 248.

The vehicle information acquisition unit 241 acquires vehicle information including information (driver ID, vehicle type, vehicle ID) regarding the vehicle 20 that is stored in a memory unit inserted into the drive recorder 2. The vehicle information that can be acquired by the vehicle information acquisition unit 241 may further include, for example, driving start time, driving stop time, vehicle speed over time, vehicle interior temperature, steering wheel angle, braking amount, and the like.

The position information acquisition unit 242 acquires, from a GPS sensor 213 (FIG. 4) or the like, information including position information (latitude information, longitude information) of the vehicle over time.

The acceleration information acquisition unit 243 acquires, from the acceleration sensor 211 (FIG. 4), acceleration information of the vehicle over time.

The event detection unit 244 determines, on the basis of the acceleration, whether or not the vehicle has been involved in certain events. The certain events are, for example, hazardous events, and may be events such as sudden acceleration or sudden deceleration.

The image generation unit 245 acquires image data including at least one of moving images and still images from the camera 23 by capturing images with the camera 23, and generates and outputs, at designated intervals, captured images for uploading based on the image data. As an example, the image generation unit 245 generates captured images at a generation rate of 1 fps (frames per second). In other words, the image generation unit 245 generates one captured image per second. The image generation unit 245 generates captured images at a generation rate of 30 fps or the like when an event is detected by the event detection unit 244.

The driving condition data transmission unit 246 transmits, to the deterioration diagnosis device 1, driving condition data including the above-mentioned vehicle information, position information (latitude information, longitude information), and acceleration information, as well as driving condition data generation times, the ID of the drive recorder 2, and the driver ID. The driving condition data may include weather information such as the brightness outside the vehicle and the weather, and the travel time.

The event data transmission unit 247 transmits event data if the occurrence of an event is detected by the event detection unit 244. The event data may include the acceleration, the speed, the steering wheel rotation angle, and the braking amount when the event occurrence was detected, the event occurrence time, vehicle position information (latitude information, longitude information), the ID of the drive recorder 2, the driver ID, and the like. The event data may further include other sensing information. The event data may include an identifier indicating the type of event.

The image transmission unit 248 transmits the captured images generated by the image generation unit 245 to the deterioration diagnosis device 1.

Figure 6:
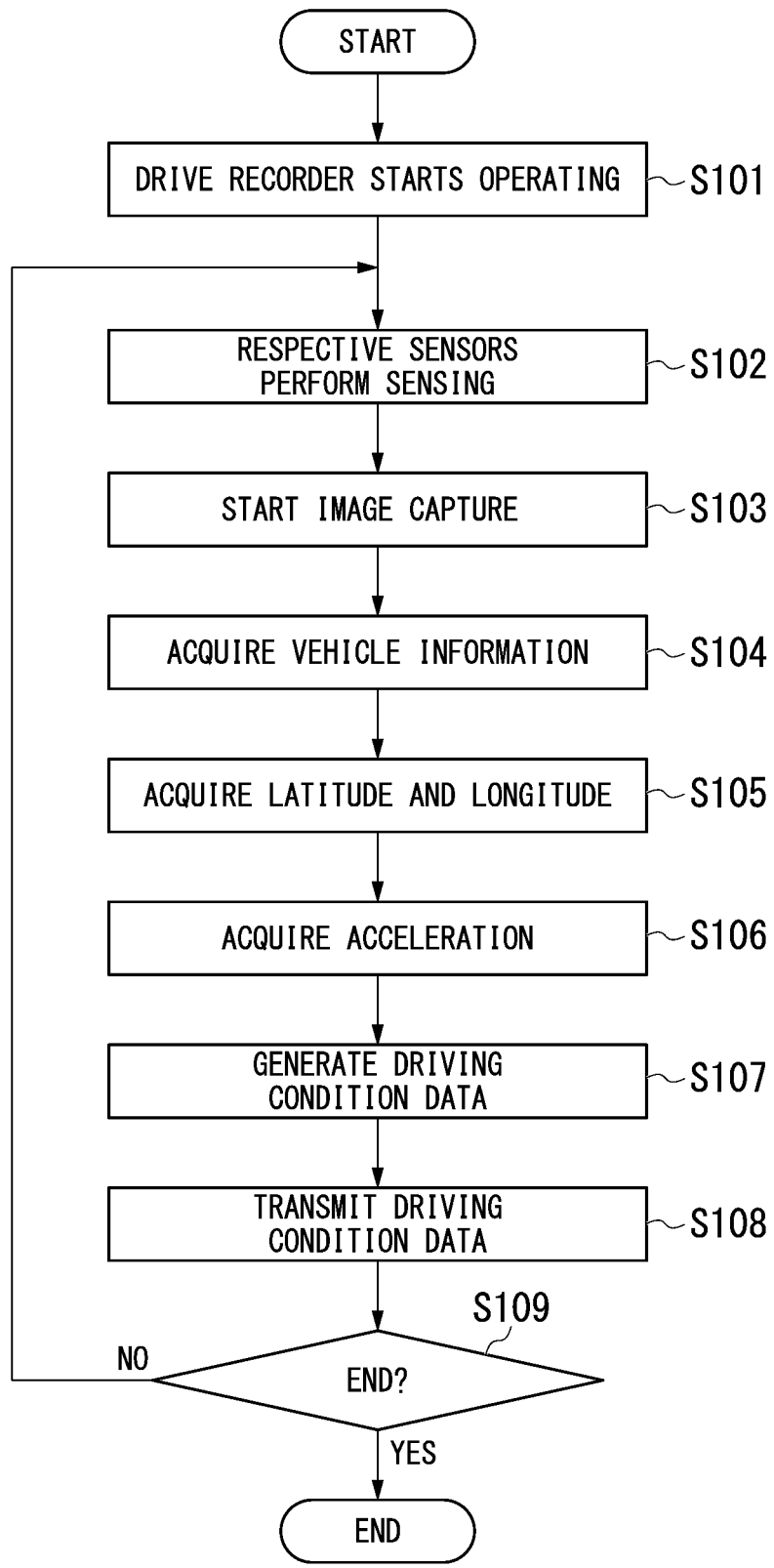
FIG. 6 is a first diagram indicating the processing flow in a drive recorder according to an embodiment of the present invention.

FIG. 6 is a first diagram indicating the processing flow in a drive recorder.

Next, the processing flow in the drive recorder 2 will be explained in order.

First, the driving condition data transmission process in the drive recorder 2 will be explained in accordance with FIG. 6.

When the electrical system in a vehicle is activated, the drive recorder 2 starts operating (step S101). The sensors 21 in the drive recorder 2 respectively start various types of sensing after the drive recorder 2 has started (step S102). Additionally, the camera 23 starts capturing images (step S103). Then, while the drive recorder 2 is operating, the vehicle information acquisition unit 241 in the control device 24 acquires vehicle information (step S104).

Additionally, the position information acquisition unit 242 acquires position information (latitude information, longitude information) from the GPS sensor 213 at prescribed time intervals (step S105). Additionally, the acceleration information acquisition unit 243 acquires acceleration information from the acceleration sensor 211 at prescribed time intervals (step S106). The prescribed time intervals may, for example, be every 0.1 seconds.

The driving condition data transmission unit 246 acquires the vehicle information, position information (latitude information, longitude information), and acceleration information acquired in steps S104, S105, and S106, and generates driving condition data including the above information, the driving condition data generation time, the ID of the drive recorder 2, and the driver ID (step S107).

The driving condition data transmission unit 246 requests the communication device 22 to transmit the driving condition data to the deterioration diagnosis device 1. The communication device 22 transmits the driving condition data to the deterioration diagnosis device 1 (step S108). The control device 24 determines whether or not the process should be ended (step S109), and repeats the process from step S102 until the process ends.

Figure 7:
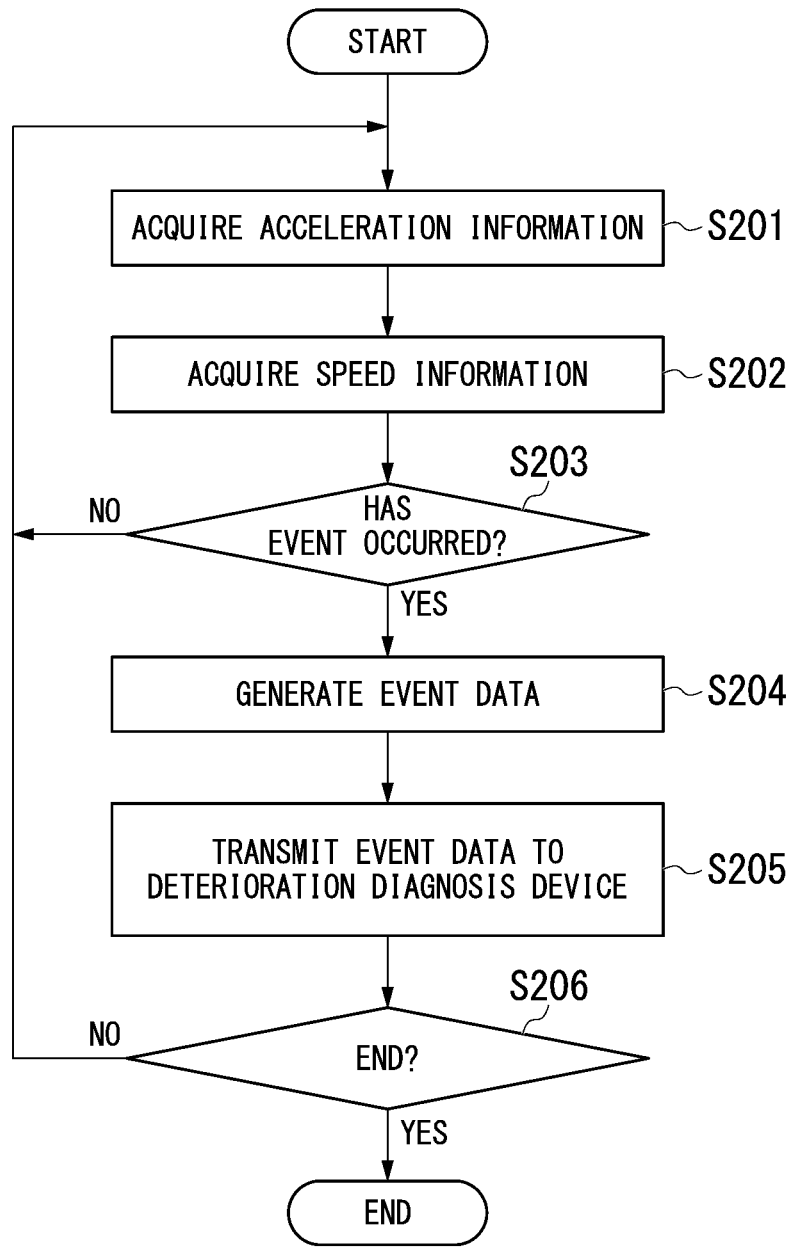
FIG. 7 is a second diagram indicating the processing flow in a drive recorder according to an embodiment of the present invention.

FIG. 7 is a second diagram indicating the processing flow in the drive recorder.

The drive recorder 2 performs an event detection process in parallel with the driving condition data transmission process.

First, when the drive recorder 2 is started, the event detection unit 244 in the control device 24 acquires acceleration information from the acceleration information acquisition unit 243 at prescribed time intervals (step S201). Additionally, the event detection unit 244 acquires speed information from the vehicle information acquisition unit 241 at prescribed time intervals (step S202). The event detection unit 244 detects whether or not a vehicle has been involved in an event based on the change over time in the acceleration and speed of the vehicle (step S203).

The event detection unit 244 may detect whether or not an event has occurred by using information such as the steering wheel angle or the braking amount acquired, as vehicle information, by the vehicle information acquisition unit 241.

For example, the steering wheel rotating by a prescribed angle or more in a short time period such as 0.1 seconds indicates a steering wheel action for the case in which the driver has suddenly turned the steering wheel by a large amount. For this reason, the event detection unit 244 detects the occurrence of an event such as hazard avoidance. Additionally, the braking amount being a prescribed braking amount or more indicates a brake action for the case in which the driver has suddenly braked. For this reason, the event detection unit 244 detects the occurrence of an event such as hazard avoidance. In this case, the event data is hazard information. The event data (hazard information) may include information (braking amount, steering wheel angle, acceleration information, and acceleration information due to a collision in the case of a collision accident) acquired by the various sensors when an accident has occurred.

When the occurrence of an event is detected, the event detection unit 244 generates event data (step S204). The event data may include the acceleration, the speed, the steering wheel rotation angle, and the braking amount, the event occurrence time, vehicle position information (latitude information, longitude information), the ID of the drive recorder 2, the driver ID, and the like, at the time the event occurrence was detected. The event data may further include other sensing information.

The event data transmission unit 247 acquires the event data from the event detection unit 244. The event data transmission unit 247 instructs the communication device 22 to transmit the event data to the deterioration diagnosis device 1. The communication device 22 transmits the event data to the deterioration diagnosis device 1 (step S205). The control device 24 determines whether or not the process should be ended (step S206), and repeats the process from step S201 until the process ends.

The events mentioned above are events indicating hazardous situations in the present embodiment, and the event data is one embodiment of information indicating driving conditions. Therefore, the event data may be included in the driving condition data and may be sent to the deterioration diagnosis device 1 by the driving condition data transmission unit 246.

Figure 8:
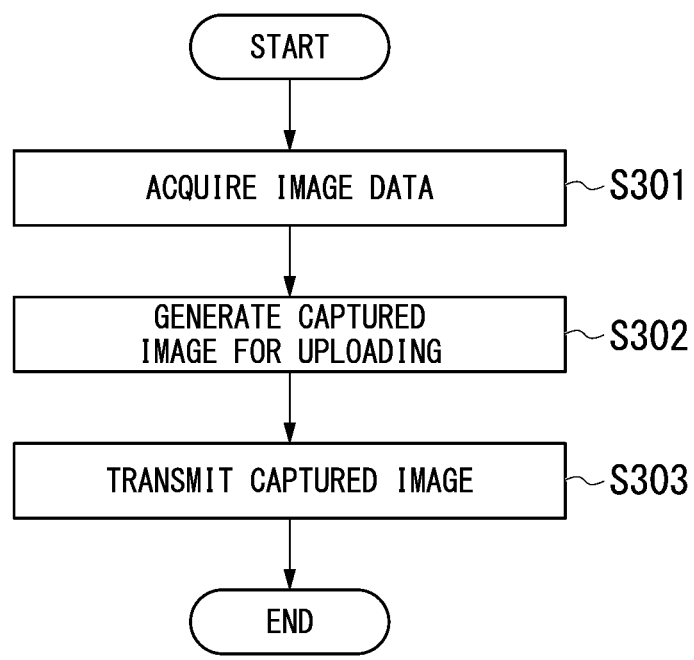
FIG. 8 is a third diagram indicating the processing flow in a drive recorder according to an embodiment of the present invention.

FIG. 8 is a third diagram indicating the processing flow in the drive recorder.

Next, the process by which the drive recorder 2 transmits captured images to the deterioration diagnosis device 1 will be explained in accordance with FIG. 8.

The image generation unit 245 acquires, from the camera 23, image data including at least one of moving images and still images captured by the camera 23 (step S301). The image generation unit 145 generates, at prescribed intervals, captured images for uploading, based on the acquired image data (step S302). Additionally, the image generation unit 145 may generate captured images at prescribed intervals by acquiring image data from the camera 23.

The image generation unit 145 instructs the image transmission unit 248 to transmit the captured images that have been generated. The image generation unit 145 may include, as attribute information in data indicated by the captured images, information such as the generation time (or image capture time), vehicle position information (latitude information, longitude information), the ID of the drive recorder 2, and the driver ID. The image transmission unit 248 transmits the captured image to the deterioration diagnosis device 1 by means of the communication device 22 (step S303).

Figure 9:
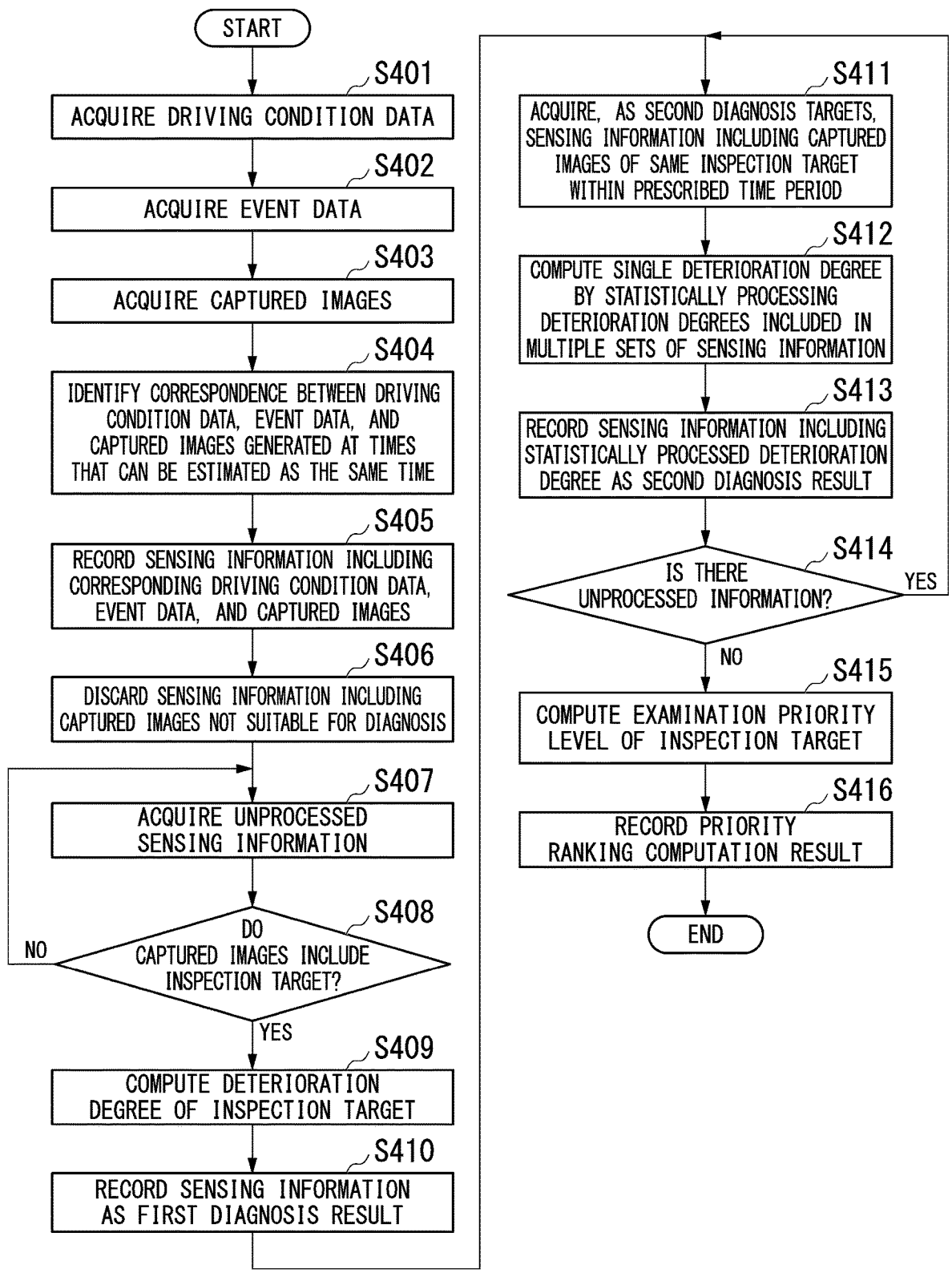
FIG. 9 is a first diagram indicating the processing flow in a deterioration diagnosis device according to an embodiment of the present invention.

FIG. 9 is a first diagram indicating the processing flow in the deterioration diagnosis device.

In the deterioration diagnosis device 1, the acquisition unit 12 acquires, through means of the communication module 105, driving condition data transmitted from the communication device 22 of a vehicle 20 (step S401). Additionally, the acquisition unit 12 acquires event data transmitted from the communication device 22 in the vehicle 20 through the communication module 105 (step S402). Additionally, the acquisition unit 12 acquires captured images transmitted from the communication device 22 in the vehicle 20 (step S403).

The acquisition unit 12 outputs the driving condition data, the event data, and the captured images acquired in steps S401 to S403 to the deterioration degree analysis unit 14.

The deterioration degree analysis unit 14, based on the time information and the ID of the drive recorder 2 included in the driving condition data, the event data, and the captured image, identifies the correspondence relationship between the information generated at times that can be estimated to be the same time (step S404). For example, the deterioration degree analysis unit 14 links driving condition data, event data, and captured images for which the time information is included within the same time band.

The deterioration degree analysis unit 14, upon identifying the correspondence relationship between the driving condition data, the event data, and the captured images, temporarily records sensing information, organized by the correspondence relationship, so as to be arranged in the order of time (step S405). For example, the deterioration degree analysis unit 14 records sensing information in the same time band in chronological order. The sensing information is information included in the driving condition data, the event data, and the captured images.

There may be cases in which the sensing information does not include event data, such as cases in which an event is not detected at the time driving condition data or captured images were generated. Sensing information in which driving condition data, event data, and captured images are organized may be generated at prescribed intervals, such as every second, by the drive recorder 2. In such cases, the drive recorder 2 may periodically transmit the sensing information to the deterioration diagnosis device 1.

Of the sensing information that has been temporarily recorded, the deterioration degree analysis unit 14 discards sensing information containing captured images not suitable for image diagnosis (step S406).

For example, the deterioration degree analysis unit 14 acquires, from the driving condition data included in the sensing information, information such as the weather conditions in the area in which the vehicle 20 is traveling, the travel time, and the like, as well as the travel speed of the vehicle 20. In the deterioration degree analysis unit 14, if the information indicated by the weather conditions indicate rain or if the time is nighttime, then there is a possibility that the appearance of the inspection target has not been accurately captured. For this reason, sensing information including such weather condition information in the driving condition data is discarded. Additionally, in the deterioration degree analysis unit 14, if the travel speed of the vehicle is a prescribed speed or higher, then there is a possibility that the appearance of the inspection target has not been accurately captured. For this reason, sensing information including such a travel speed in the driving condition data is discarded.

This discarding process is an example of a process for the deterioration degree analysis unit 14 to identify captured images matching prescribed sensing conditions based on the information contained in the sensing information and analyzing the deterioration degrees of inspection targets appearing in such captured images. The prescribed sensing conditions are capture conditions of captured images indicating that the images are suitable for image analysis. The categories of the capture conditions are, for example, the weather conditions, the travel time, the travel speed, and the like.

Next, the deterioration degree analysis unit 14 acquires sensing information including the oldest time information of the temporarily stored unprocessed sensing information (step S407). Furthermore, the deterioration degree analysis unit 14 acquires the captured images in the sensing information. The deterioration degree analysis unit 14 determines whether or not an inspection target is included in the captured images (step S408). Inspection targets are road surfaces, vehicle traffic lines printed on road surfaces, guard rails, signs, traffic lights, streetlamps, and the like.

The deterioration degree analysis unit 14 uses image pattern matching, machine learning processes, or AI (Artificial Intelligence) analyses to determine whether or not these inspection targets are contained in the captured images. Known technology may be used to recognize the inspection targets in the captured images.

If the deterioration degree analysis unit 14 determines that an inspection target is included in a captured image (YES in step S408), then an inspection target ID identifying the type of the inspection target is inserted in sensing information. The inspection target ID is such that, even if the inspection target is of the same type, a different ID is assigned for each deterioration type of the inspection target. In other words, the inspection target ID is also identification information indicating the inspection target type.

The deterioration degree analysis unit 14 computes the deterioration degree of the inspection target on the basis of the captured image in which the inspection target is recognized (step S409). When the deterioration degree of the inspection target is computed, the deterioration degree analysis unit 14 inserts the deterioration degree value in the sensing information. The deterioration degree analysis unit 14 records the sensing information including the inspection target ID and the deterioration degree value, as a first diagnosis result, in a storage unit such as a database (step S410). The deterioration degree analysis unit 14 repeatedly performs the processes in step S407 to step S410 on unprocessed sensing information.

A specific example of the deterioration degree computation process (S409) will be explained.

As mentioned above, the deterioration degree analysis unit 14 uses image pattern matching, machine learning processes, AI analysis, or the like to identify the type of the inspection target appearing in the captured image. Types of inspection targets are, for example, cracks, potholes, and ruts in road surfaces, vehicle traffic lines, guard rails, signs, traffic lights, streetlamps, and the like.

In the case in which the inspection target appearing in the captured image is a crack in a road surface, the deterioration degree analysis unit 14 identifies the size (length, width) of the crack from the captured image and computes the deterioration degree based on the size of the crack. The larger the size of the crack, the higher the deterioration degree is.

Additionally, in the case in which the inspection target appearing in the captured image is a hole in a road surface, the deterioration degree analysis unit 14 identifies the size (diameter, width) of the hole from the captured image and computes the deterioration degree based on the size of the hole. The larger the size of the hole, the higher the deterioration degree is.

Additionally, in the case in which the inspection target appearing in the captured image is a road surface, the deterioration degree analysis unit 14 identifies the size (length, width) of the rut from the captured image and computes the deterioration degree based on the size of the rut. The larger the size of the rut, the higher the deterioration degree is.

Additionally, in the case in which the inspection target appearing in the captured image is a vehicle traffic line that is printed on a road surface, the deterioration degree analysis unit 14 identifies the degree of distinctness (degree of whiteness of white lines, color value) of the traffic line from the captured image and computes the deterioration degree based on the degree of distinctness. The lower the degree of distinctness, the higher the deterioration degree is.

Additionally, in the case in which the inspection target appearing in the captured image is a guard rail installed on a roadside, the deterioration degree analysis unit 14 identifies the shape of the guard rail from the captured image and computes the deterioration degree based on the difference between that shape and a prescribed shape. The larger the difference between the shape of the guard rail and the prescribed shape, the higher the deterioration degree is.

Additionally, in the case in which the inspection target appearing in the captured image is a sign installed on a roadside, the deterioration degree analysis unit 14 identifies the shape (degree of pole bending, orientation of the sign itself, etc.) of the sign from the captured image and computes the deterioration degree based on the difference between that shape and a prescribed shape. The larger the difference between the shape of the sign and the prescribed shape, the higher the deterioration degree is.

Additionally, in the case in which the inspection target appearing in the captured image is a traffic light installed over a road, the deterioration degree analysis unit 14 identifies the state (signal light brightness, etc.) of the traffic light from the captured image and computes the deterioration degree based on that state. The lower the signal light brightness of the traffic light, the higher the deterioration degree is.

Additionally, in the case in which the inspection target appearing in the captured image is a streetlamp installed on a roadside, the deterioration degree analysis unit 14 identifies the state (light brightness, pole tilt, etc.) of the streetlamp from the captured image and computes the deterioration degree based on that state. The lower the light brightness of the streetlamp, or the greater the tilt of the pole, the higher the deterioration degree is.

The first diagnosis results (S410) mentioned above include recognition results for inspection targets in captured images obtained by using sensing information acquired from multiple different vehicles 20, and deterioration degree estimation results for those inspection targets. In other words, the stored first diagnosis results include deterioration degrees based on sensing information acquired by each of multiple vehicles 20. Therefore, the deterioration degree analysis unit 14 computes a statistical value of the deterioration degree of the same inspection target acquired by different vehicles 20 included in the first analysis results. In other words, the deterioration degree analysis unit 14 extracts multiple first diagnosis results for the same inspection target from among the stored first diagnosis results, and computes a statistical value based on the multiple first diagnosis results that have been extracted.

Specifically, the deterioration degree analysis unit 14 acquires, as second diagnosis targets, multiple sets of sensing information including captured images of the same inspection target captured within a prescribed time period, based on the position information (latitude information, longitude information), the inspection target IDs, and the times included in the sensing information (step S411).

For example, the deterioration degree analysis unit 14 identifies the same inspection targets based on the position information and the inspection target IDs. For example, the deterioration degree analysis unit 14 identifies inspection targets having proximate position information and matching inspection target IDs as the same inspection target. The deterioration degree analysis unit 14 acquires, as second diagnosis targets, from multiple sets of sensing information including captured images of the same inspection target that has been identified, sensing information including captured images of the same inspection target captured within a prescribed time period.

If there is only one set of sensing information including captured images for the same inspection target captured within a prescribed time period, then that sensing information may be acquired as a second diagnosis target. The prescribed time period may, for example, be one day, one week, one month, or the like.

The deterioration degree analysis unit 14 statistically processes the deterioration degrees included in one or multiple sets of sensing information acquired as second diagnosis targets, and computes a single deterioration degree for the specific inspection target indicated by those sets of sensing information (step S412). Specifically, the deterioration degree analysis unit 14 may compute an average value of the deterioration degree values included in one or multiple sets of sensing information acquired as second diagnosis targets, and may take that average value as a single deterioration degree for the specific inspection target indicated by those sets of sensing information.

Alternatively, the deterioration degree analysis unit 14 classifies the deterioration degree values included in one or multiple sets of sensing information acquired as second diagnosis targets as being either equal to or higher than a prescribed threshold value, or less than the threshold value. In this case, the deterioration degree analysis unit 14 may compute a deterioration degree that indicates deterioration when there is less than a prescribed proportion of the sensing information whose a deterioration degree lower than the threshold value, and that indicates that it has not deteriorated when there is more than or equal to the prescribed proportion of the sensing information whose the deterioration degree lower than the threshold value. In other words, the deterioration degree analysis unit 14 determines that an inspection target is not deteriorated when the deterioration degree is lower than the threshold value in the prescribed proportion or more of the multiple sets of sensing information of the second diagnosis targets.

For example, there may be cases in which there are, for the same inspection target, sensing information in which a deterioration degree indicating a crack in the road surface is computed due to the influence of shadows, obstacles, or the like, and sensing information including a deterioration degree having a low value not indicating a crack. If there is at least a prescribed proportion of sensing information including a deterioration degree not indicating a crack in the road surface, then it can be determined that the sensing information includes cases in which a crack in the road surface has been erroneously identified due to the influence of shadows. For this reason, the deterioration degree analysis unit 14 can compute a deterioration degree indicating that there is no deterioration.

In other words, there are cases in which the multiple sets of sensing information in the second diagnosis targets include sensing information that has been erroneously determined to have a deterioration degree that is equal to or higher than the threshold value due to the influence of the image capture conditions. Even in such cases, an appropriate deterioration degree can be computed by basing the computation on multiple sets of sensing information.

The deterioration degree analysis unit 14 may compute, as a statistical value of the deterioration degrees, a deterioration degree that exhibits a high value in the case in which the deterioration degree is increasing or in the case in which the rate of increase in the deterioration degree is fast, based on the change over time in the deterioration degrees included in multiple sets of sensing information acquired as the second diagnosis targets. In other words, the deterioration degree analysis unit 14 may compute a high deterioration degree in the case in which the deterioration degrees in multiple sets of sensing information are increasing with the passage of time, or in the case in which the rate of increase in the deterioration degree is high.

The deterioration degree analysis unit 14 records, as second diagnosis results, sensing information including the deterioration degrees obtained after statistical processing computed by using the sensing information acquired as the second diagnosis targets (step S413). The deterioration degree analysis unit 14 determines whether or not the sensing information included in the first diagnosis results includes unprocessed information (step S414). If there is unprocessed information (YES in S414), then the deterioration degree analysis unit 14 repeats the process from step S411.

Next, the priority ranking computation unit 15 computes the inspection (examination) priority level of an inspection target based on the deterioration degrees of the same inspection target and the driving conditions corresponding to the inspection target (step S415).

Specifically, the priority ranking computation unit 15 acquires one set of sensing information among the sensing information recorded as second diagnosis results. The priority ranking computation unit 15 acquires the inspection target ID included in the sensing information. The inspection target ID is information identifying the type of the inspection target.

In order to determine whether or not the deterioration of the inspection target indicated by this inspection target ID has affected driving, it is preferable to analyze the event data included in the sensing information. For example, when the inspection target ID indicates a hole in the road surface, there are cases in which the event data includes information indicating that the driver has suddenly turned the steering wheel or that the driver has braked during the operation of the vehicle 20.

Therefore, the priority ranking computation unit 15 determines, on the basis of the event data included in the sensing information, whether or not an event possibly corresponding to the inspection target ID included in the sensing information has occurred.

The priority ranking computation unit 15 computes the examination priority level based on the deterioration degree included in the sensing information acquired from the second diagnosis results, and whether or not that sensing information includes event data indicating an event corresponding to the inspection target ID.

If event data indicating an event corresponding to the inspection target ID is included in sensing information in the second diagnosis results, then it can be understood that there is a high likelihood that a driving operation due to which the event occurred was caused by the deterioration in the inspection target. Therefore, if event data indicating an event corresponding to the inspection target ID is included in sensing information, then the priority ranking computation unit 15, for example, computes the priority level by multiplying the deterioration degree by a prescribed weighting coefficient.

Priority level values corresponding to the inspection target ID and priority level values corresponding to the deterioration degrees may be predefined. The priority ranking computation unit 15 reads inspection target IDs, deterioration degrees, and event data from the sensing information. The priority ranking computation unit 15 computes priority levels, for example, by multiplying all of a priority level value corresponding to an inspection target ID, a priority level value corresponding to a deterioration degree, and a weighting coefficient corresponding to event data indicating an event corresponding to the inspection target ID. This manner of computation of the priority level is one example, and the priority level may be computed by another method.

The priority ranking computation unit 15 records priority ranking computation results linking the sensing information acquired from the second diagnosis results with a priority level computed for that sensing information (step S416).

The deterioration diagnosis device 1 may accept the registration of report information regarding an inspection target and may further use that report information to compute the priority level. The report information is, for example, inspection target deterioration information reported by a resident. For example, report information including position information (latitude information, longitude information) of inspection targets and information regarding the deterioration degrees thereof from residents is registered and stored in a database or the like. Furthermore, when computing the priority levels, the priority ranking computation unit 15 reads, from the database, report information corresponding to the position information included in the sensing information in the second diagnosis results. The priority ranking computation unit 15 may compute the priority level by further multiplying a weighting coefficient corresponding to the value of the deterioration degree included in the report information.

Additionally, the priority ranking computation unit 15 may compute a priority level based on the number of complaints from residents, the distances from public facilities (schools, hospitals, etc.), the population density, and the like regarding each inspection target. The priority ranking computation unit 15 computes the priority level by further multiplying a large weighting coefficient in the case in which there are many complaints, in the case in which the distance from a public facility is close, and in the case in which the population density is high.

According to the above processes, the priority ranking computation unit 15 computes examination priority rankings of respective inspection targets based on at least the deterioration degrees of the same inspection target appearing in multiple captured images, and driving condition data (event data) and report information corresponding to the inspection targets. Therefore, in cases in which hazard avoidance events of vehicles due to the deterioration conditions of inspection targets have occurred, or in cases in which there have been reports, weighting coefficients can be multiplied to compute higher-value priority levels. Therefore, more highly accurate examination priority rankings of the inspection targets can be specified in accordance with the driving conditions. Thus, the accuracy of the work of identifying high-priority inspection targets and high-priority inspection locations can be increased.

Additionally, according to the process mentioned above, the priority ranking is computed by using sensing information including captured images captured by drive recorders 2 mounted on vehicles 20. For this reason, the priority ranking for examining public installations can be automatically computed simply by having personnel drive vehicles 20 through town. As a result thereof, the labor required for the work of identifying high-priority inspection targets and inspection locations can be reduced.

In the description above, the case in which the drive recorders 2 are mounted on vehicles 20 was used as an example, but the drive recorders 2 may also be mounted on other moving bodies. The other moving bodies may, for example, be bicycles, mobility scooters, or the like. Additionally, in the description above, the case in which the inspection targets are road-associated installations provided on road surfaces and roadsides is used as an example. However, the inspection targets may, for example, be railroads or runways, or may be various installations provided in a station, an airport, a building, or the like. In that case, a drive recorder 2 may be mounted on a mobile patrol device and be moved inside a facility such as a station, an airport, or a building, and may identify the examination priority rankings of various installations by means of a similar process.

Figure 10:
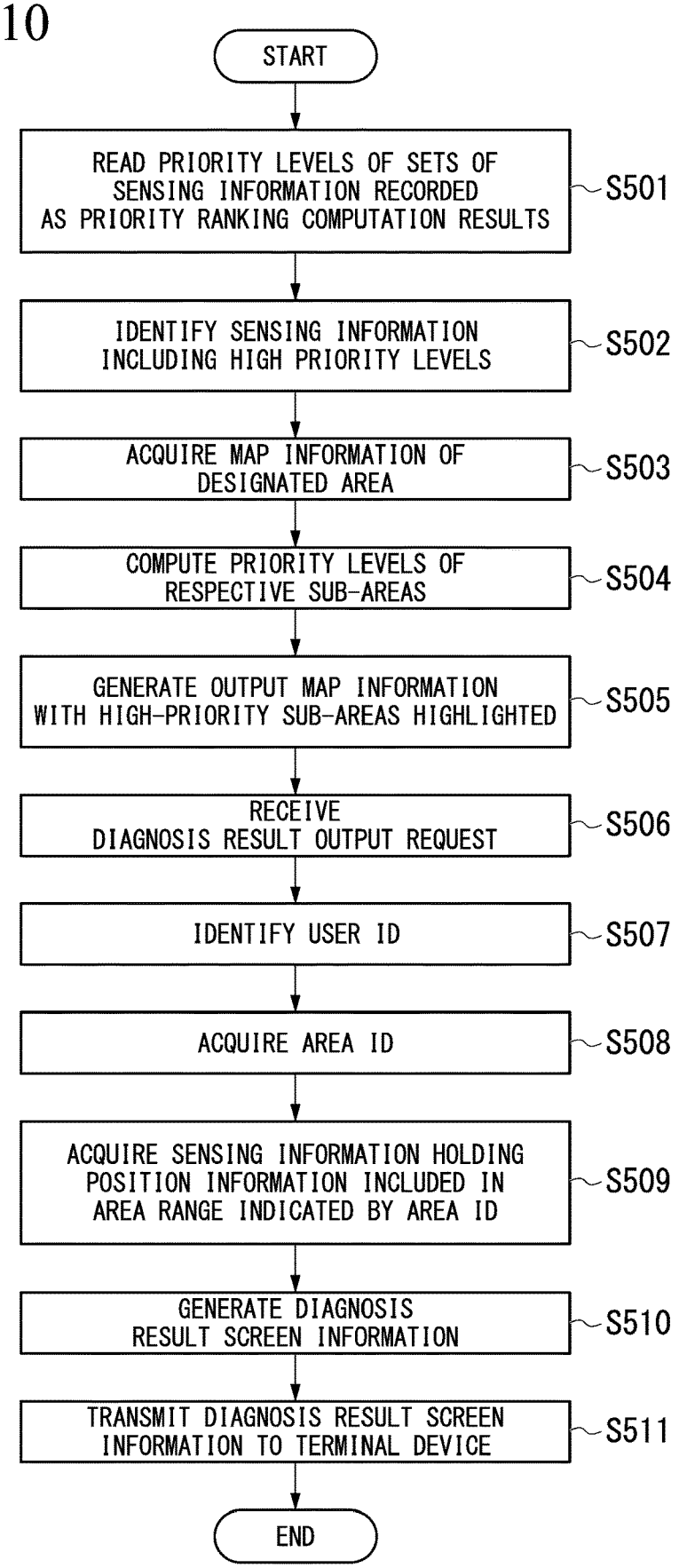
FIG. 10 is a second diagram indicating the processing flow in a deterioration diagnosis device according to an embodiment of the present invention.

FIG. 10 is a second diagram indicating the processing flow in the deterioration diagnosis device.

Next, the processing in the diagnosis result generation unit 16 in the deterioration diagnosis device 1 will be explained.

According to the process described above, priority levels are inserted in the sets of sensing information acquired as second diagnosis targets, and the sets of sensing information are recorded in the database as priority ranking computation results. In such a state, the diagnosis result generation unit 16 reads the priority levels of the sets of sensing information recorded as priority ranking computation results (step S501). The diagnosis result generation unit 16 identifies sets of sensing information including high priority levels of a prescribed value or higher (step S502).

The diagnosis result generation unit 16 acquires map information for a designated area (step S503). The designated area may be predetermined, or may be input by a user via an interface. The diagnosis result generation unit 16, for example, based on the number of sets of sensing information having position information included in sub-areas obtained by horizontally and vertically dividing the designated area indicated by the map information, computes the priority level of each sub-area (step S504). For example, in accordance with the number of sets of sensing information, each sub-area is assigned information indicating a high priority level, a medium priority level, or a low priority level. The diagnosis result generation unit 16 generates output map information in which, among the sub-areas included in the designated area of the map information, the sub-areas having a high priority level are displayed in a highlighted manner (step S505). The diagnosis result generation unit 16 links the generated output map information with area IDs and records the information in the database.

The diagnosis result generation unit 16 may similarly generate output map information for the map information of multiple areas. The diagnosis result generation unit 16 may compute the priority levels of the sub-areas by using the priority levels included in the sensing information in addition to the number of sets of sensing information having position information contained in the sub-areas. As one example, the diagnosis result generation unit 16 acquires the examination priority levels of inspection targets computed in step S415 regarding sets of sensing information having position information contained in a sub-area. The diagnosis result generation unit 16 computes the priority level of the sub-area by using a computational formula defined so that sub-areas in which high-priority inspection targets are present are assigned high priority levels.

The deterioration diagnosis device 1 receives diagnosis result output requests from prescribed devices (terminal devices) (step S506). The output unit of the deterioration diagnosis device 1 can generate diagnosis result screen information based on the diagnosis result output request, and output the information to the terminal device. For example, the deterioration diagnosis device 1 identifies a user ID included in the diagnosis result output request (step S507). It is assumed that an area ID corresponding to the user ID was predesignated when the user registered for the service, and is stored in a user database or the like. The output unit 17 acquires the area ID corresponding to the user ID from the user database (step S508).

The output unit 17 acquires output map information recorded in the database so as to be linked to the area ID, and acquires, from the priority ranking computation results, sets of sensing information holding position information included in the area range indicated by that area ID (step S509). Alternatively, the output unit 17 may store information regarding the area range predesignated by the user.

The output unit 17 generates diagnosis result screen information based on the acquired output map information and the sensing information (step S510). The output unit 17 transmits the diagnosis result screen information to a terminal device (step S511). As a result thereof, the diagnosis result screen information is displayed on the terminal device.

FIG. 11 to FIG. 17 are diagrams illustrating examples of displays on the terminal device.

Figure 11:
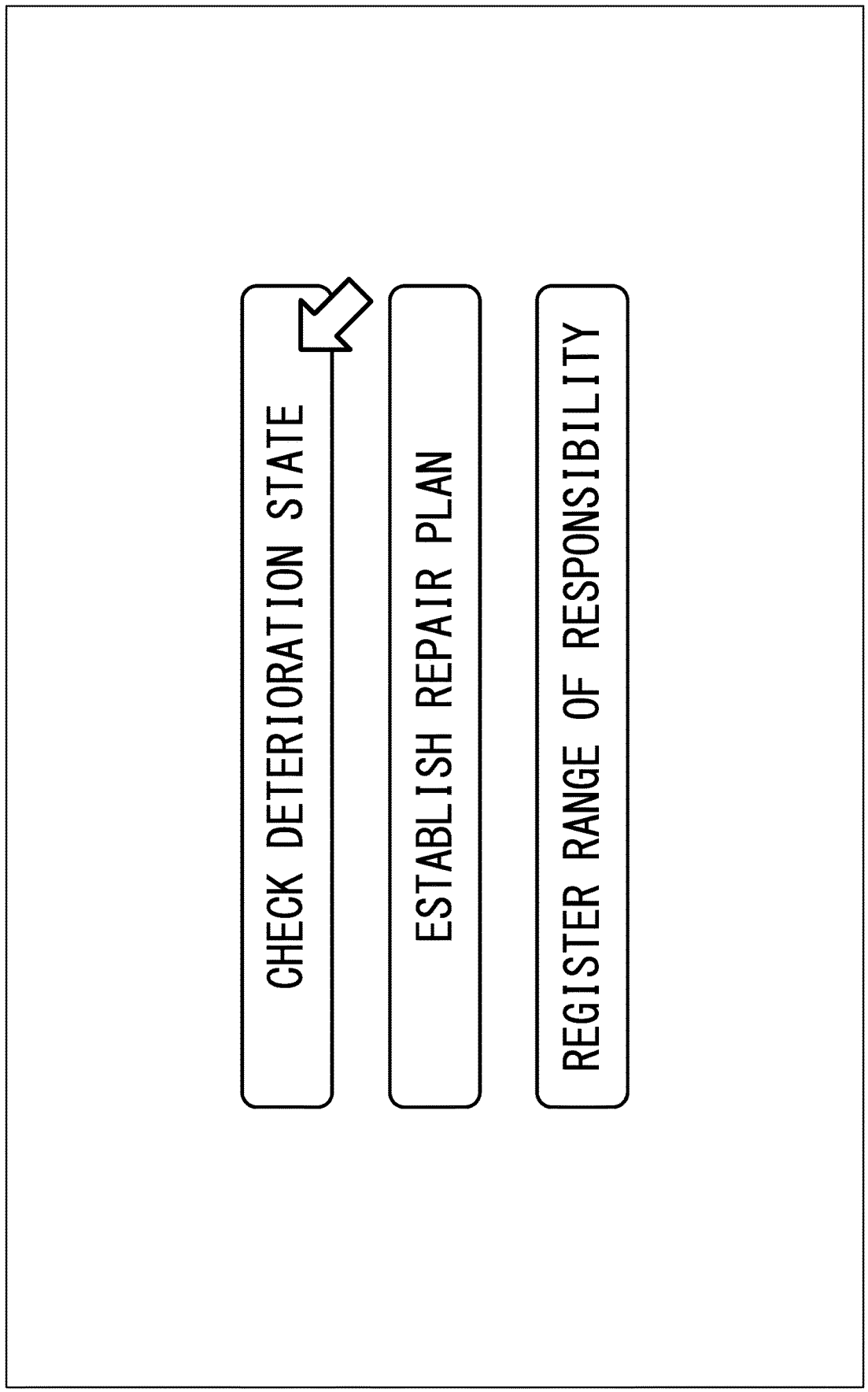
FIG. 11 is a first diagram indicating an example of a display on a terminal device according to an embodiment of the present invention.

FIG. 11 is an example of a display of a menu screen. For example, personnel (user) at an administrative authority that performs maintenance of public installations activates the menu screen and starts work for checking the deterioration state of public installations.

Figure 12:
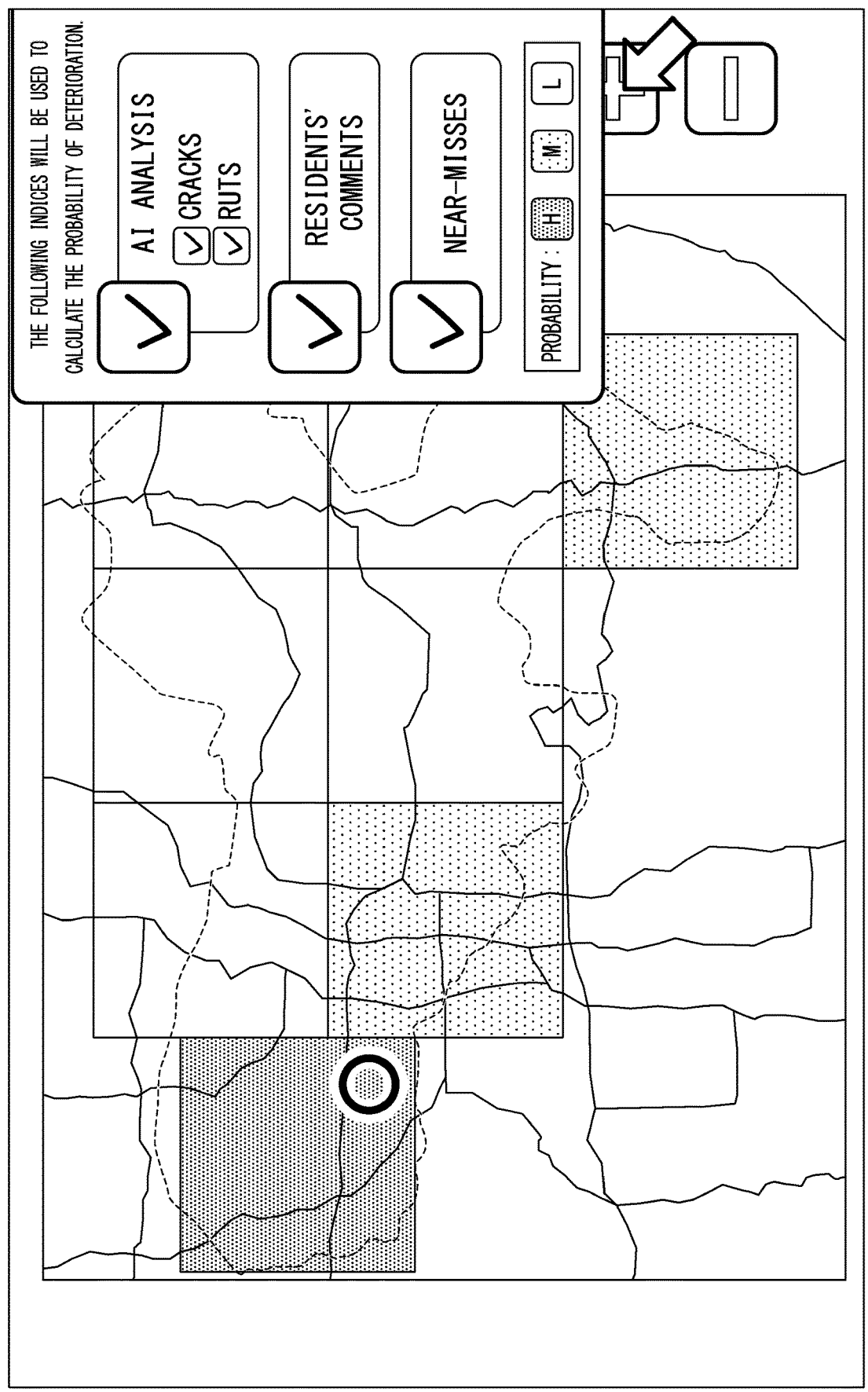
FIG. 12 is a second diagram indicating an example of a display on a terminal device according to an embodiment of the present invention.

FIG. 12 to FIG. 17 are diagrams illustrating examples of displays of diagnosis result (analysis result) screen information. In FIG. 12, the sub-areas obtained by horizontally and vertically dividing the area indicated by designated map information are displayed so as to be color-coded in accordance with the probability of deterioration. Additionally, in FIG. 12, the results of computation of the probability of deterioration using, as indices, AI analysis results regarding cracks and ruts, the comments of residents (report information), and near-miss information (hazard information) are displayed.

Figure 13:
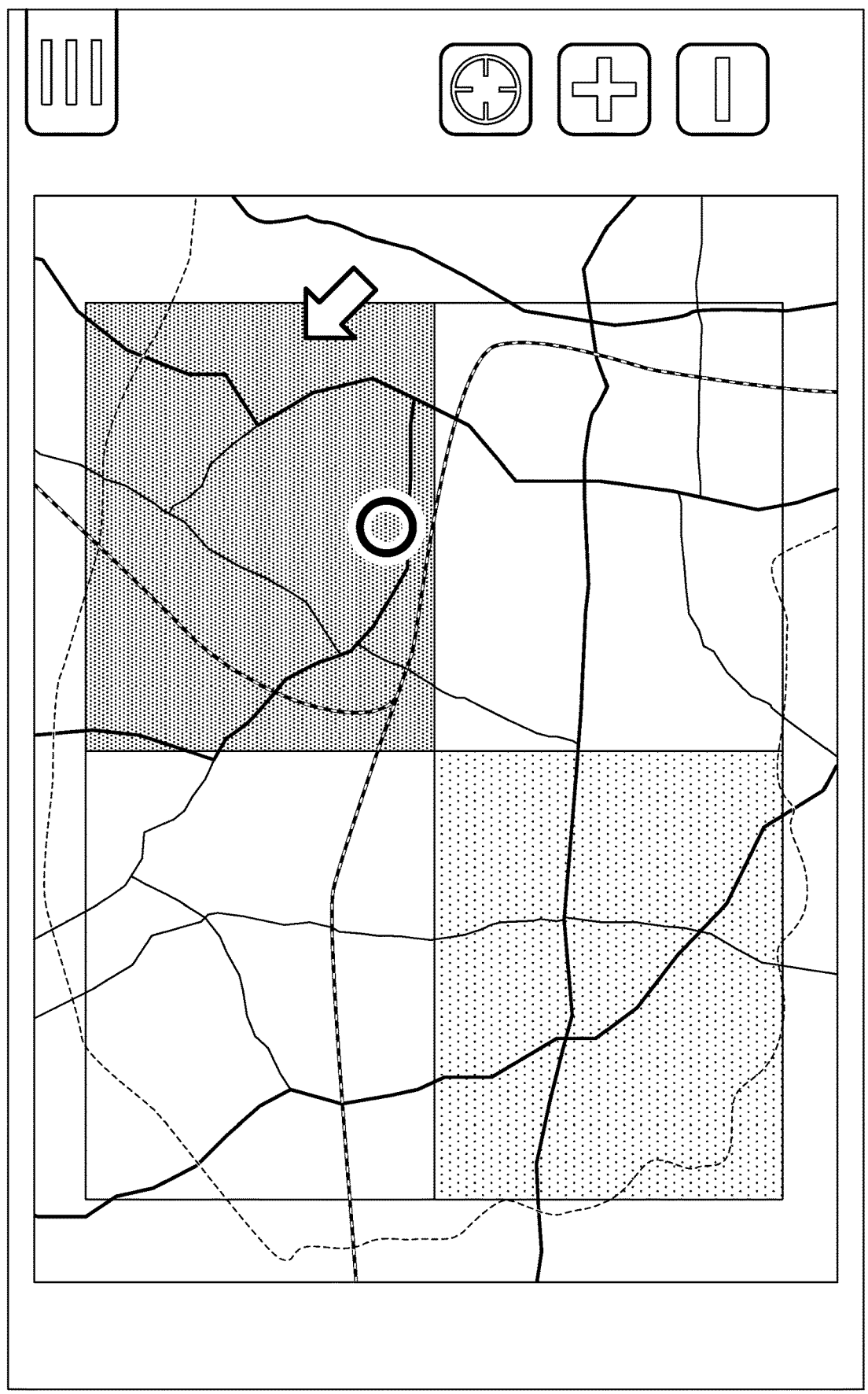
FIG. 13 is a third diagram indicating an example of a display on a terminal device according to an embodiment of the present invention.

In FIG. 13, a sub-area selected by the user in the display example illustrated in FIG. 12 is enlarged.

Figure 14:
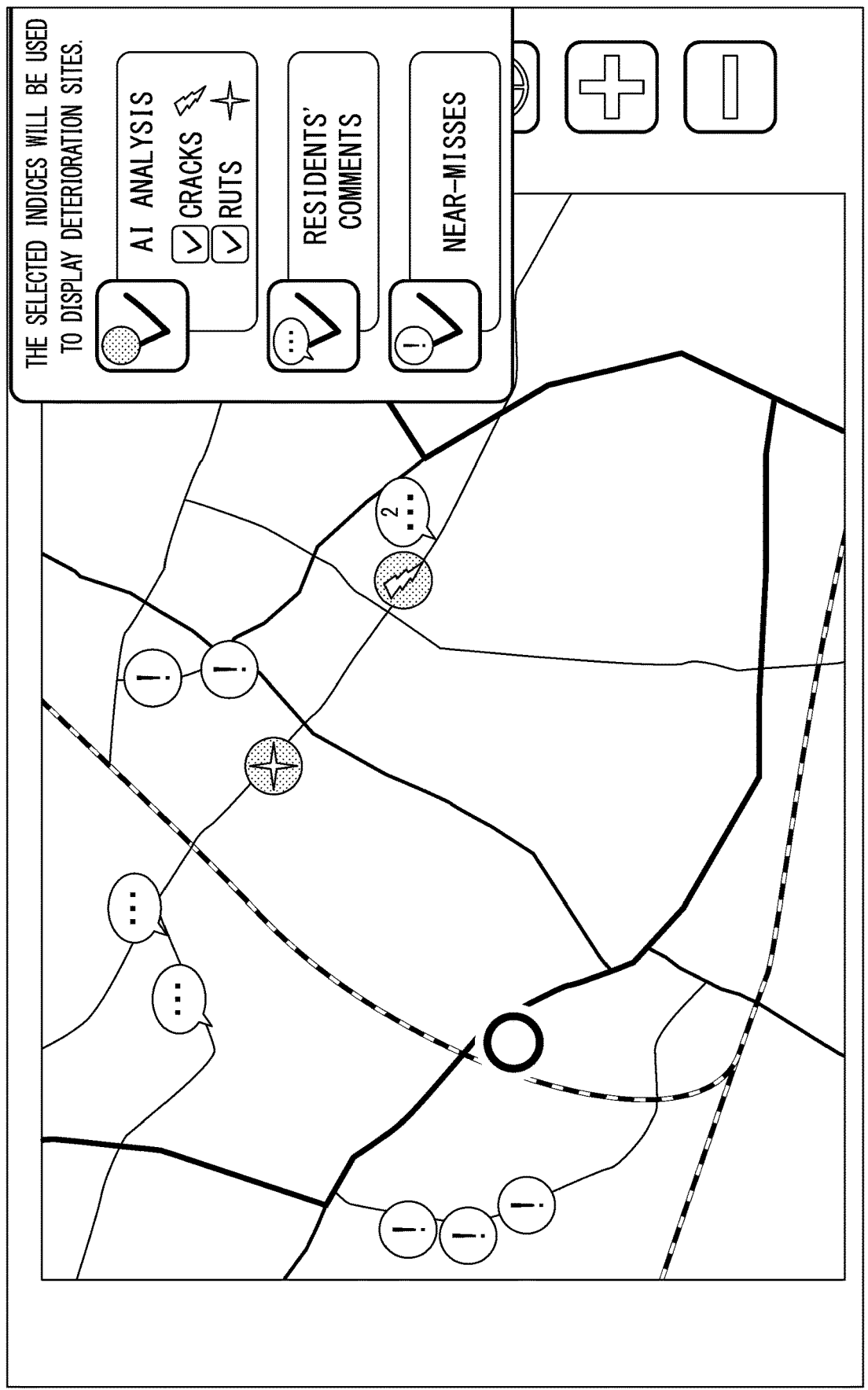
FIG. 14 is a fourth diagram indicating an example of a display on a terminal device according to an embodiment of the present invention.

In FIG. 14, AI analysis results regarding cracks and ruts, the comments of residents, and near-miss information are selected as indices, and corresponding icons are displayed on the map at positions where a deterioration site may exist.

Figure 15:
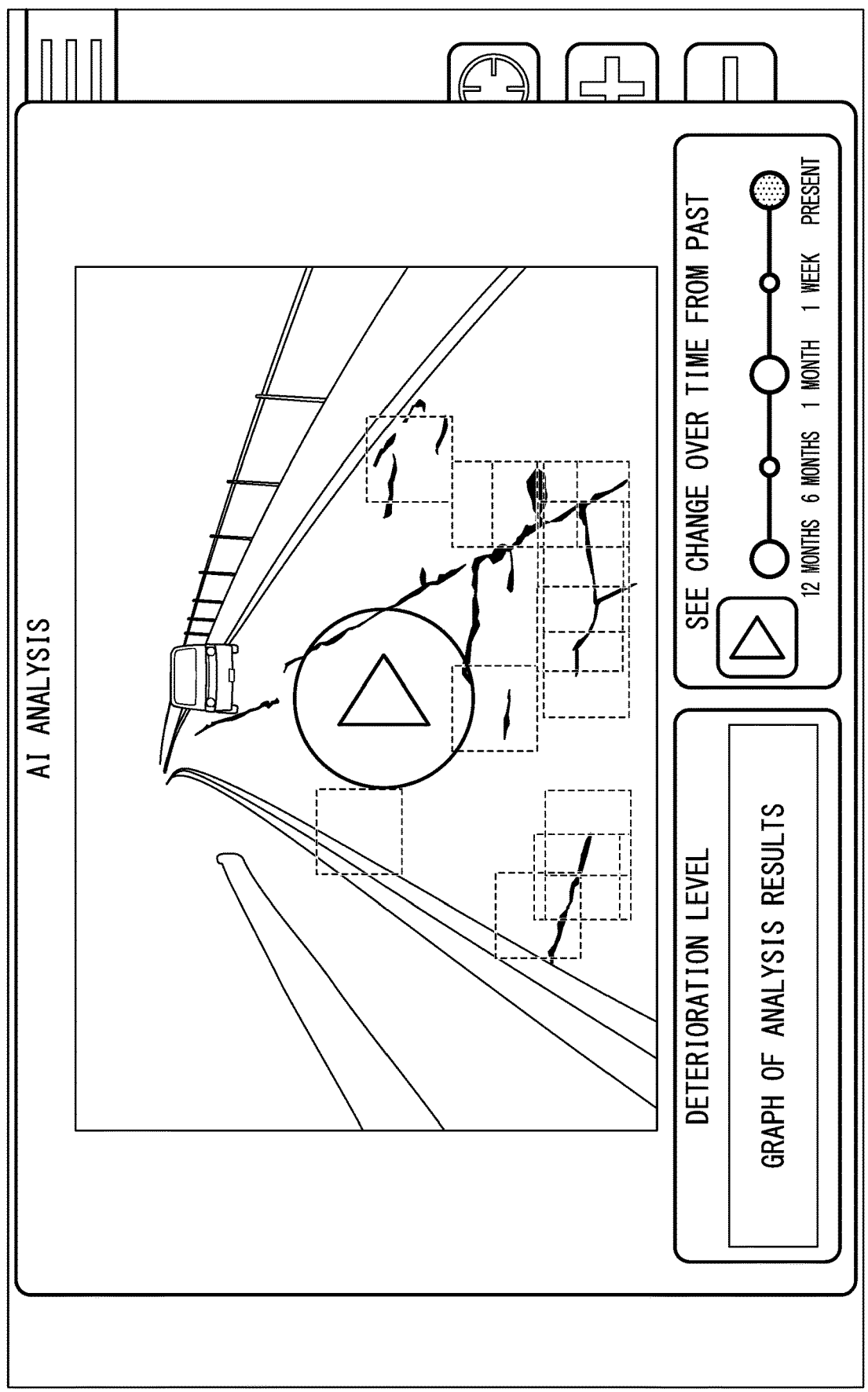
FIG. 15 is a fifth diagram indicating an example of a display on a terminal device according to an embodiment of the present invention.

FIG. 15 is an example of the display of an image of a deterioration site, the level of deterioration, and the change in the deterioration over time. FIG. 15 illustrates an example of a display of the change in the deterioration over time by a moving image.

Figure 16:
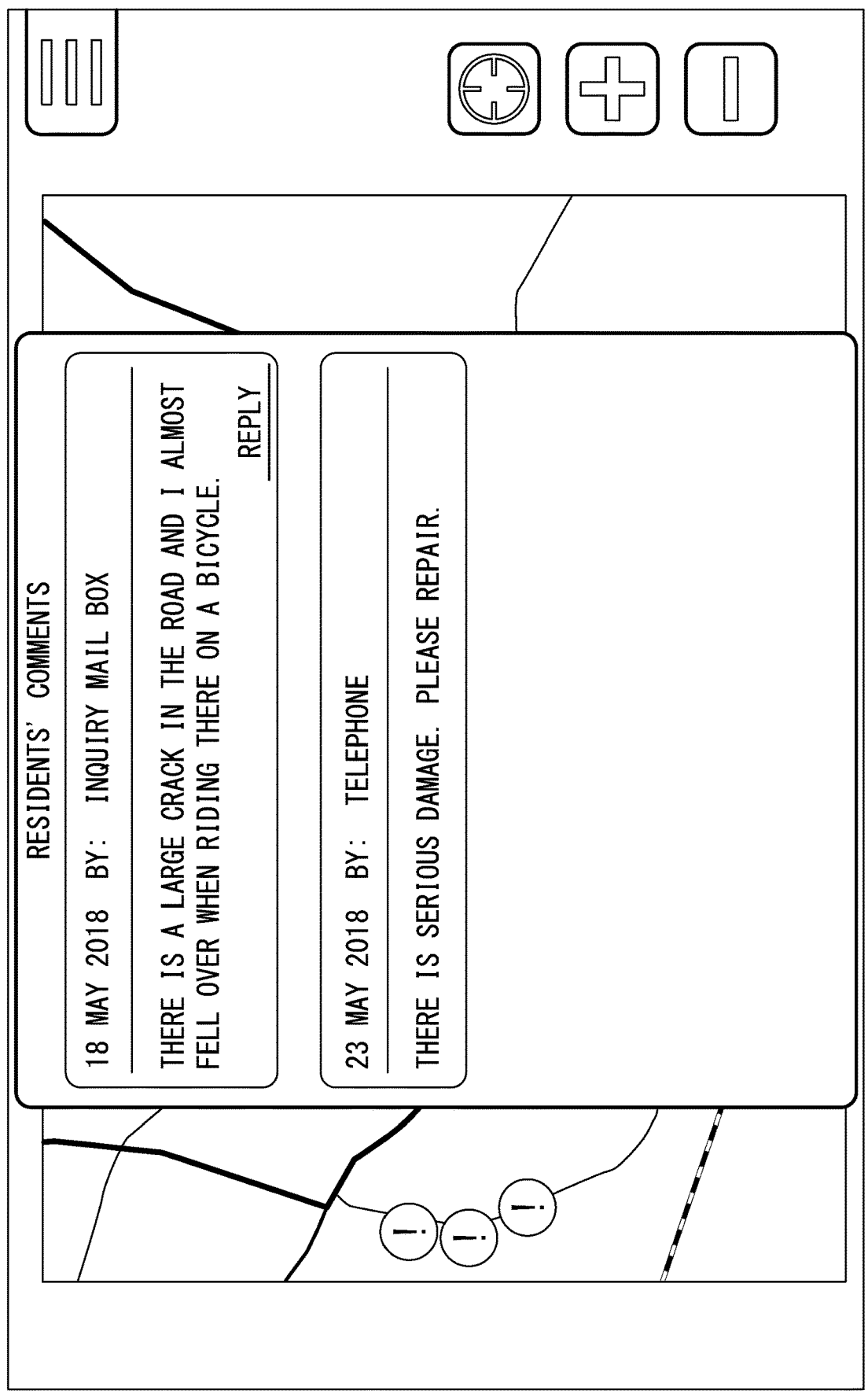
FIG. 16 is a sixth diagram indicating an example of a display on a terminal device according to an embodiment of the present invention.

FIG. 16 is an example of the display of the comments (report information) of residents.

Figure 17:
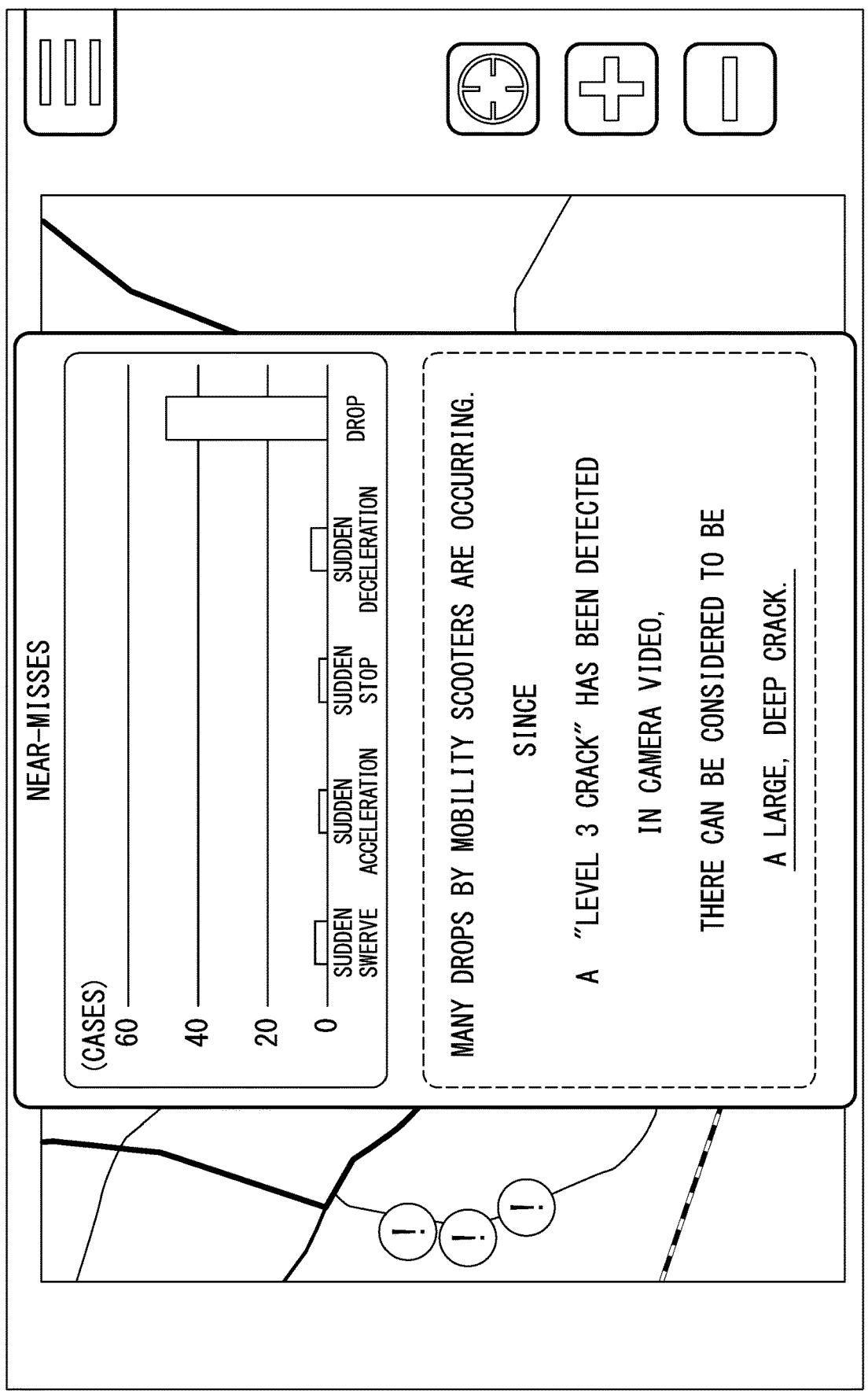
FIG. 17 is a seventh diagram indicating an example of a display on a terminal device according to an embodiment of the present invention.

FIG. 17 is an example of the display of near-miss information (hazard information).

The monitor of the terminal device is, for example, composed of a touch panel or the like, and prescribed positions on the screen of the monitor can be selected. The user selects a prescribed sub-area from the map information displayed in a display region of the diagnosis result screen information displayed on the monitor of the terminal device (FIG. 12). The terminal device transmits an ID of the sub-area to the deterioration diagnosis device 1.

The output unit 17 acquires, from the database, data for an enlarged map of the area indicated by the sub-area ID and sensing information including position information included in the area of that map, and transmits the data to the terminal device. The terminal device displays, in the display region, the enlarged map of the sub-area received from the deterioration diagnosis device 1 (FIG. 13). The terminal device displays icon images corresponding to the inspection targets located within the sub-area in the enlarged map at locations on the enlarged map corresponding to the latitudes and longitudes of the inspection targets. The user can select icon images corresponding to the inspection targets displayed on the enlarged map.

When the user selects a certain icon image on the enlarged map, the terminal device detects the location of that icon image. The terminal device identifies sensing information including the inspection target corresponding to that icon image. The terminal device acquires information such as captured images, the degree of deterioration, report information, and the inspection target ID included in that sensing information, and outputs the information to a prescribed display region in the diagnosis result screen information (FIG. 14).

If the residents' comments icon is further selected, then the terminal device may display stored report information, as illustrated in FIG. 16. Additionally, when the near-miss icon is selected, the terminal device may display a graph of hazard information and analysis results, as illustrated in FIG. 17.

The output unit 17 of the deterioration diagnosis device 1 may generate a moving image generated by using multiple captured images of the same inspection target and joining them in chronological order for being displayed in the display region of the diagnosis result screen information (FIG. 15).

The output unit 17 of the deterioration diagnosis device 1 identifies sensing information including the same position and the same inspection target ID in a prescribed time period, and acquires the captured images included in those sets of sensing information. The output unit 17 generates a moving image by joining the captured images in the order of the generation times included in the sensing information.

Upon detecting that an icon image has been selected on the enlarged map displayed in the display region, the output unit 17 may transmit, to the terminal device, a moving image generated for the position and the inspection target corresponding to that icon image. The terminal device displays the moving image in the display region and plays the moving image based on user operations. As a result thereof, the user can view the moving image displayed and generated in the display region and observe the change in the deterioration degree of the inspection target over time.

In the description above, the deterioration diagnosis device 1 computes the deterioration degree in step S409. However, the deterioration diagnosis device 1 may be configured so as to determine whether or not an inspection target is included in step S408 without computing the deterioration degree, and to record sensing information including only the determination result as the first diagnosis result in step S410. In this case, the deterioration diagnosis device 1 may be configured so as not to perform the process in steps 411 to S416 and to generate and transmit, to the terminal device, diagnosis result screen information indicating where the inspection target is located based on the sensing information including whether or not there is an inspection target. In this case, the deterioration diagnosis device 1 may output diagnosis result screen information for the range of a sub-area matching the conditions of position information designated on the basis of the geographical range for which the user is responsible.

Figure 18:
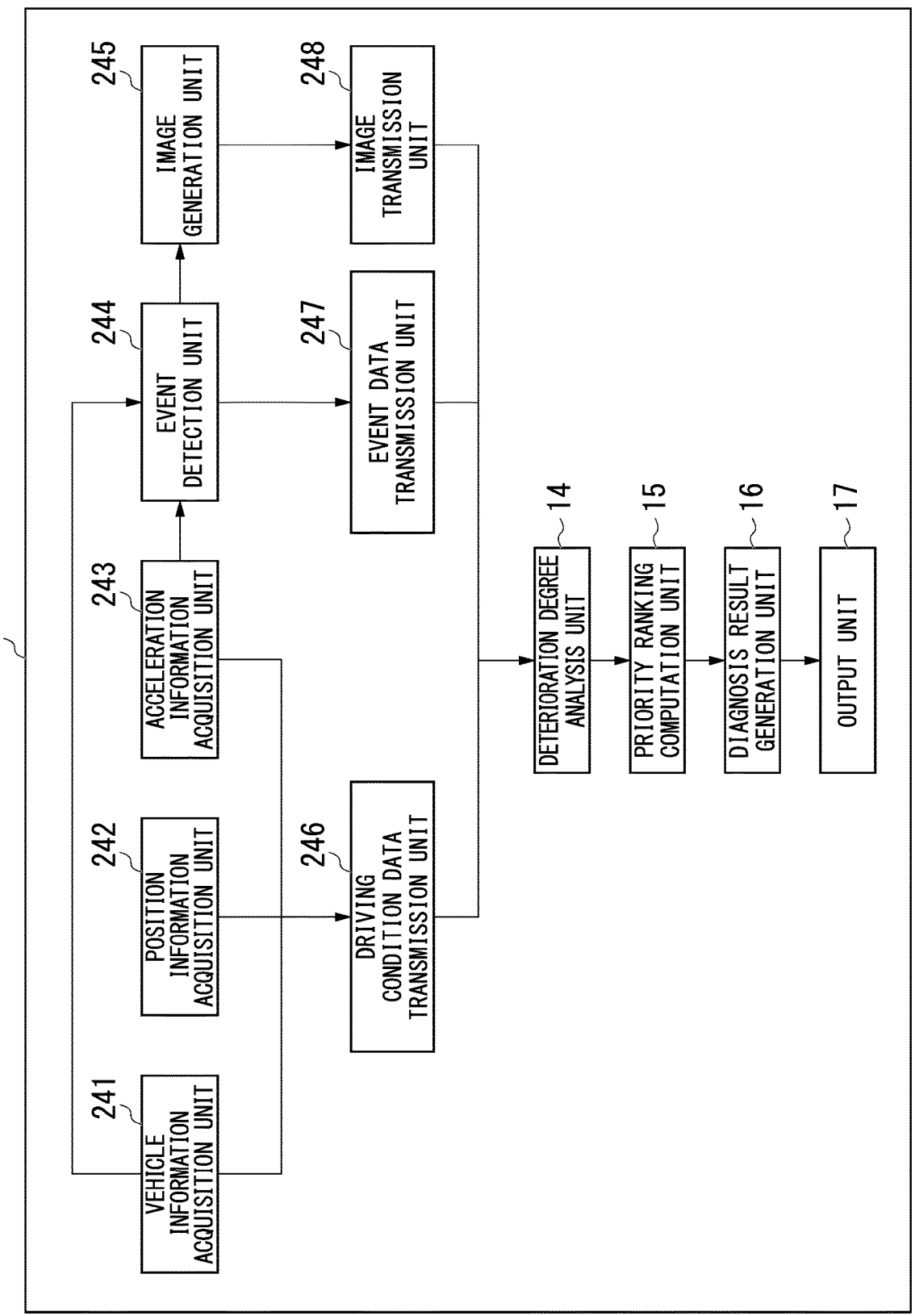
FIG. 18 is a diagram illustrating a second example of a deterioration diagnosis device according to an embodiment of the present invention.

FIG. 18 is a diagram illustrating a second embodiment of the deterioration diagnosis device.

The deterioration diagnosis device 1 illustrated in FIG. 18 is a diagram illustrating an example for the case in which each function in the deterioration diagnosis device is provided inside a drive recorder 2.

By executing a program, a control device 24 in the drive recorder 2 may provide, in addition to the functions in the control device 24 illustrated in FIG. 5, the functions of the deterioration degree analysis unit 14, the priority ranking computation unit 15, the diagnosis result generation unit 16, and the output unit 17 in the deterioration diagnosis device 1 illustrated in FIG. 3. The processing in the respective functional units in this case is similar to that mentioned above. However, in this case, the drive recorder 2 receives the sensing information from other vehicles via a server or the like through a communication network.

Figure 19:
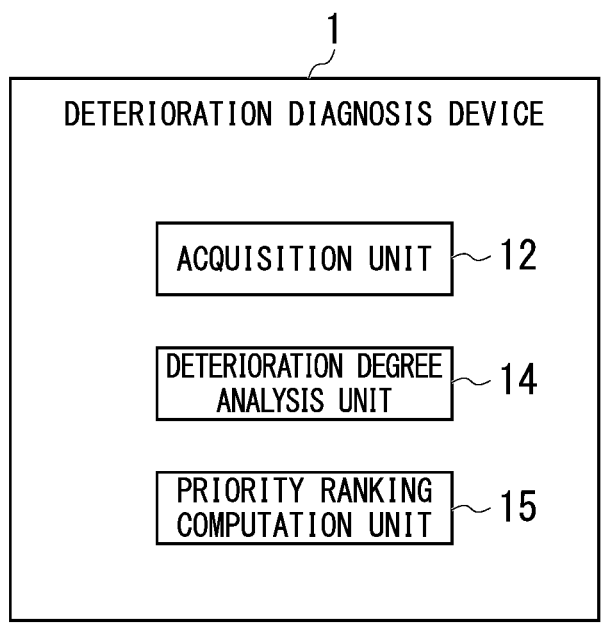
FIG. 19 is a diagram illustrating the minimum structure of a deterioration diagnosis device according to an embodiment of the present invention.

FIG. 19 is a diagram illustrating the minimum structure of the deterioration diagnosis device.

The deterioration diagnosis device 1 illustrated in this drawing is provided with at least an acquisition unit 12, a deterioration degree analysis unit 14, and a priority ranking computation unit 15.

The acquisition unit 12 acquires sensing information including at least captured images captured by an image capture device mounted on a moving body, driving condition information of the moving body, and position information for the positions at which those capture images and driving condition information were generated.

The deterioration degree analysis unit 14 analyses the deterioration degrees of inspection targets appearing in the captured images.

The priority ranking computation unit 15 computes the priority rankings of different inspection targets appearing in multiple captured images on the basis of the deterioration degrees of the same inspection target appearing in the captured images identified by the position information, and driving condition information corresponding to the inspection targets.

The priority ranking computation unit may be provided in a device that is separate from the deterioration diagnosis device. Thus, the deterioration diagnosis system overall may be in a form including the acquisition unit, the deterioration degree analysis unit, and the priority ranking computation unit.

The above-mentioned deterioration diagnosis device 1, the control device 24 in the drive recorder 2, and the terminal device have computer systems in the interiors thereof. Furthermore, the steps in the above-mentioned processes are stored in the form of a program in a computer-readable recording medium, and the above-mentioned processes are performed by a computer reading and executing this program.

The above-mentioned program may be for realizing just a portion of the afore-mentioned functions. Furthermore, it may be a so-called difference file (difference program) that can realize the aforementioned functions by being combined with a program that is already recorded in a computer system.

Priority is claimed on Japanese Patent Application No. 2018-139617, filed Jul. 25, 2018, the entire disclosure of which is incorporated herein by reference.

INDUSTRIAL APPLICABILITY

According to the present invention, the accuracy of work for identifying inspection targets and inspection locations that are of high priority can be improved.

REFERENCE SIGNS LIST

1 Deterioration diagnosis deice
2 Drive recorder
11 Control unit
12 Acquisition unit
14 Deterioration degree analysis unit
15 Priority ranking computation unit
16 Diagnosis result generation unit
17 Output unit
21 Sensor
22 Communication device
23 Camera 24 Control device
25 Storage device
211 Acceleration sensor
212 Sound detection sensor
213 GPS sensor
241 Vehicle information acquisition unit
242 Position information acquisition unit
243 Acceleration information acquisition unit
244 Event detection unit
245 Image generation unit
246 Driving condition data transmission unit
247 Event data transmission unit
248 Image transmission unit

The invention claimed is:

1. A deterioration diagnosis device comprising:
at least one memory configured to store instructions; and
at least one processor configured to execute the instructions to;
acquire, from each of a plurality of vehicles, sensing information including at least a captured image captured by an image capture device mounted on a corresponding vehicle, driving condition information indicating driving details of the corresponding vehicle, and position information corresponding to the captured image and the driving condition information;
analyze a deterioration degree of an inspection target appearing in each captured image acquired from the plurality of vehicles;
compute a single deterioration degree of the inspection target appearing in multiple captured images, which are acquired from the plurality of vehicles, identified by the position information based on analyzed deterioration degrees of the inspection target; and
compute a priority ranking of the inspection target based on the single deterioration degree of the inspection target appearing in the multiple captured images identified by the position information, and the driving condition information corresponding to the inspection target.

2. The deterioration diagnosis device according to claim 1,
wherein the at least one processor is configured to execute the instructions to:
identify at least hazard information which is one type of the driving condition information corresponding to the inspection target, and compute an inspection priority level of the inspection target as the priority ranking based on the computed single deterioration degree and a weighting coefficient corresponding to the hazard information.

3. The deterioration diagnosis device according to claim 1,
wherein the at least one processor is configured to execute the instructions to:
compute the priority ranking of the inspection target based on deterioration report information regarding the inspection target.

4. The deterioration diagnosis device according to claim 1,
wherein the at least one processor is configured to execute the instructions to:
identify the captured image that matches prescribed sensing conditions based on the information contained in the sensing information, and analyze the deterioration degree of the inspection target appearing in the each captured image.

5. The deterioration diagnosis device according to claim 1,
wherein the at least one processor is configured to execute the instructions to:
compute the single deterioration degree of the inspection target appearing in the multiple captured images based on statistical results regarding the analyzed deterioration degrees of the inspection target appearing in the multiple captured images.

6. The deterioration diagnosis device according to claim 1,
wherein the at least one processor is further configured to execute the instructions to:
output map information indicating an area having a high priority ranking identified based on a number of multiple inspection targets in which the deterioration degree is equal to or higher than a threshold value, and corresponding priority rankings of the multiple inspection targets.

7. The deterioration diagnosis device according to claim 1, wherein
the driving condition information includes the driving details that indicates an occurrence of an action of the corresponding vehicle for hazard avoidance, and
the at least one processor is configured to execute the instructions to compute the priority ranking of the inspection target based on the single deterioration degree of the inspection target appearing in the multiple captured images, and presence or absence of the driving condition information corresponding to the position information of the inspection target.

8. The deterioration diagnosis device according to claim 2,
wherein the hazard information includes at least one of braking amount, steering wheel angle, or acceleration information.

9. A deterioration diagnosis system comprising:
an image capture device that captures an image of outside of a corresponding vehicle;
at least one memory configured to store instructions; and
at least one processor configured to execute the instructions to;
acquire, from each of a plurality of vehicles, sensing information including at least a captured image captured by the image capture device, driving condition information indicating driving details of the corresponding vehicle, and position information corresponding to the captured image and the driving condition information;
analyze a deterioration degree of an inspection target appearing in each captured image acquired from the plurality of vehicles;
compute a single deterioration degree of the inspection target appearing in multiple captured images, which are acquired from the plurality of vehicles, identified by the position information based on analyzed deterioration degrees of the inspection target; and
compute a priority ranking of the inspection target based on the single deterioration degree of the inspection target appearing in the multiple captured images identified by the position information, and the driving condition information corresponding to the inspection target.

10. A deterioration diagnosis method comprising:
acquiring, from each of a plurality of vehicles, sensing information including at least a captured image captured by an image capture device mounted on a corresponding vehicle, driving condition information indicating driving details of the corresponding vehicle, and position information corresponding to the captured image and the driving condition information;

analyzing a deterioration degree of an inspection target appearing in each captured image acquired from the plurality of vehicles;

computing a single deterioration degree of the inspection target appearing in multiple captured images, which are acquired from the plurality of vehicles, identified by the position information based on analyzed deterioration degrees of the inspection target; and computing a priority ranking of the inspection target based on the single deterioration degree of the inspection target appearing in the multiple captured images identified by the position information, and the driving condition information corresponding to the inspection target.

* * * * *